US012792623B2

(12) United States Patent
Datla et al.

(10) Patent No.: US 12,792,623 B2
(45) Date of Patent: Nov. 10, 2026

(54) SOURCE DETECTION FOR LLMS USING INTERNAL TOKEN ACTIVATIONS

(71) Applicant: Capital One Services, LLC, McLean, VA (US)

(72) Inventors: Vivek Datla, Ashland, MA (US); Alfy Samuel, White Plains, NY (US); Chenyang Zhu, New York City, NY (US); Daben Liu, Belmont, MA (US); Zhiqi Huang, Cambridge, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/236,916

(22) Filed: Jun. 12, 2025

(65) Prior Publication Data

US 2026/0244634 A1 Aug. 20, 2026

Related U.S. Application Data

(60) Provisional application No. 63/758,596, filed on Feb. 14, 2025.

(51) Int. Cl.
*G06F 16/248* (2019.01)
*G06N 3/0475* (2023.01)
*G06N 3/09* (2023.01)

(52) U.S. Cl.
CPC ......... *G06F 16/248* (2019.01); *G06N 3/0475* (2023.01); *G06N 3/09* (2023.01)

(58) Field of Classification Search
CPC ....... G06F 16/248; G06N 3/0475; G06N 3/09
USPC .......................................................... 707/722
See application file for complete search history.

(56) References Cited

U.S. PATENT DOCUMENTS

2025/0315460 A1* 10/2025 Maharaj .............. G06F 16/3329
2026/0161696 A1* 6/2026 Liu ....................... G06F 16/353

OTHER PUBLICATIONS

Extended European Search Report on EP Appl. No. 26158475.9 dated Jun. 23, 2026 (9 pages).
Sun et al., "ReDeEP: Detecting Hallucination in Retrieval-Augmented Generation via Mechanistic Interpretability", arxiv.org Cornell University Library, 201 Olin Library Cornell University Ithaca, NY 14853, Oct. 15, 2024 (Oct. 15, 2024), XP091910647.
Zhang et al., "An Automatic Method to Estimate Correctness of RAG", Jan. 24, 2025 (Jan. 24, 2025), XP093406309, Retrieved from the Internet: URL:https://aclanthology.org/2025.coling-industry.52.pdf.

* cited by examiner

*Primary Examiner* — Cam Y T Truong
(74) *Attorney, Agent, or Firm* — Foley & Lardner LLP

(57) ABSTRACT

Described herein are systems, methods, and programming for determining a context source of a large language model. For example, the techniques leverage a token accessible large language model to extract token activations associated with answers generated by the model in response to prompts. The token activations can be passed to a trained classification model that learns patterns of token activations associated with context-based model outputs. The trained classification model can assign a label to the model-produced answer indicating whether the answer was generated by the large language model using the input context included by the prompt or model memory of the large language model.

20 Claims, 14 Drawing Sheets

SOURCE DETECTION FOR LLMS USING INTERNAL TOKEN ACTIVATIONS

CROSS-REFERENCE TO RELATED APPLICATION

This application claims the benefit of priority of U.S. Provisional Patent Application No. 63/758,596, filed Feb. 14, 2025. The contents of this provisional application are incorporated herein by reference in their entirety.

BACKGROUND

While Large Language Models (LLMs) are widely used in knowledge-intensive tasks, their tendency to generate incorrect or inconsistent responses remains a critical challenge, even in the Retrieval-Augmented Generation (RAG) setting.

SUMMARY

Described herein are systems, methods, and programming for determining a context source of an LLM output. In the technical field of machine learning, and particularly in the field of LLMs, a technical problem exists in incorrect or inconsistent response generation because there is a conflict between pre-trained memory of an LLM and external context provided during inference. To address this technical problem, the systems, methods, and programming simulate a RAG model with controlled perturbations in context to deliberately contradict the model's pretrained knowledge.

However, when attempting to simulate a RAG model with controlled perturbations in context to deliberately contradict the model's pretrained knowledge a first novel technical problem arises. Namely, given the complexity of LLMs, it can be difficult to determine what layer and/or input effected the model's output. For example, as LLMs get more complex, such as those having large quantities (e.g., billions, trillions, etc.) of parameters, they tend to capture complex relationships between the various input strings they have seen and learn emergent behaviors. For example, when trained on large quantities (e.g., billions, trillions, etc.) of tokens, it can be unclear during inference time which parts of their memory the LLM is addressing.

To overcome this first novel technical problem, the system may perform a novel data capture routine while the LLM is processing an input. Specifically, the system may capture complex relationships as a train of auto-regressive signals coming through the different layers of the LLM sequentially and treat the signals as a temporal chain of activations. If the answer tokens are retrieved only from memory, ignoring the context provided, the LLM can detect this event by learning patterns in the activations of neurons across multiple layers while generating the answer tokens. In particular, the query and context can represent and supporting information to be used by the model to answer the question.

In some aspects, systems and methods for determining a source of an answer generated by a target LLM whose token activations are accessible. In some examples, the systems and methods can include receiving an input prompt. The input prompt can include a query, which represents an instruction or question for the model, and a context, which includes supporting information be used by the model to answer the question/perform the instruction. Using a trained large language model, a first answer to the query based on the input prompt. From an output layer of the trained large language model, a set of token activations associated with the first answer being generated can be extracted and input to a trained classification model. The classification model can be used to obtain a label indicating that the first answer was generated using the context or memory associated with the trained large language model, and the answer and the label can be provided as a response to the input prompt.

Additionally, or alternatively, when attempting to simulate a RAG model with controlled perturbations in context to deliberately contradict the model's pretrained knowledge, a second novel technical problem arises. Namely, not all artificial intelligence models have accessible token activations that may be used to distinguish between pre-trained memory of an LLM and external context. In other words, an input prompt including a query and a context may be input to a first model, which can generate an answer. However, the first model may not offer public access to token activations (or other information regarding the inner workings of the model). Therefore, the previously mentioned techniques would not be able to be used to determine whether the generated answer is rooted in the provided context or the model's memory.

To address this second novel technical problem, the system may perform another novel data capture routine using an accessible LLM to represent token activations of a target LLM during generation of an answer to an input prompt. Specifically, because some LLMs do not offer public access to token activations (or other information regarding the inner workings of the model), a token accessible model can be used to reproduce the token activations of the target LLM while generating the model-produced answer. For example, upon generation of an answer to an input prompt, the query, context (from the input prompt), and answer can be provided to a base LLM, such as the LLM described above having accessible token activations. The query-context-answer can be input to the base LLM, and token activations associated with the generation of the answer can be extracted. These token activations, generated by the base LLM, can approximate the token activations of the target LLM when generating the same answer.

In some aspects, systems and methods for determining whether an external LLM is leveraging model memory or input context to generate responses are described. In some examples, a request from a client device to determine whether an answer generated by a first LLM responding to an input prompt, including a query and a context, was generated by the first LLM using the context or model memory of the first LLM. Access to token activations of the first large language model, in the example, may be unavailable. An input including the query, context, and answer can be received by a second LLM with which token activations are accessible. A set of token activations associated with the second LLM generating the answer can be extracted from the second LLM. This the set of token activations can be input to a classification model. The classification model may be used to obtain a label indicating whether, during generation of the answer, the first LLM used the provided context or the model memory. The answer and the label can be included in a response to the request provided to the requesting client device.

While training the classifiers is described above, a third novel technical problem arises in generating high-quality training data that correctly captures and labels samples corresponding to a target LLM using context to generate answers and samples corresponding to the target LLM using model memory to generate answers. For example, existing solutions analyzing LLM outputs focus on answer accuracy. In other words, these techniques can be tricked by answers that make sense but may not be rooted in the provided context. Increasing the difficulty of this task is that as LLMs continue to improve in scope and capability, making these LLMs better able to produce context-agnostic yet accurate answers.

To address this third novel technical problem, the systems and methods for generating labeled training data by developing controlled conflicts is described. In some examples, for training query-context-answer (QCA) triplets, a perturbation can be applied to the answer to generate a perturbated answer. Moreover, the context can be updated to include at least one recitation of the perturbated answer. An input prompt formed of the query and perturbated context can be input to the target LLM. If the model-produced answer matches the perturbated answer, this indicates that the target LLM leveraged the perturbated context when generating the model-produced answer. If the model-produced answer matches the original answer (or does not match the perturbated answer), then this indicates that the target LLM did not leverage the perturbated context when generating the model-produced answer. These labeled samples can be used to generate labeled training data, which can be formed by extracting token activations associated with each sample's generated answer and assigning that sample's label to the extracted token activation. The classification model may then be trained using the training data to learn token activation patterns associated with the target LLM using provided context or model memory to generate the answer.

In some aspects, systems and methods for configuring a classification model to determine whether answers generated an LLM are based on contexts included in corresponding input prompts provided to the LLM or model memory of the LLM are described. In some examples, a query and a context may be input into a trained LLM to obtain a first answer. A perturbated first answer and a perturbated context may generated by applying a perturbation to the first answer such that the perturbated context includes the perturbated first answer. The query and the perturbated context may be input into the trained LLM to obtain a second answer and a score, representing how closely the perturbated first answer and the second answer align with the perturbated context, may be generated. A label may be assigned to a data structure including the query, the perturbated context, and the perturbated first answer based on the score. Using an output layer of the trained LLM, a set of token activations associated with the trained large language model generating the second answer can be extracted and stored as a training sample with the set of token activations to train the classification model. The training data, which can include the training sample, may be used to train the classification model to determine whether the trained LLM generates a given answer based on a corresponding input context or model memory.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

Figure 1:
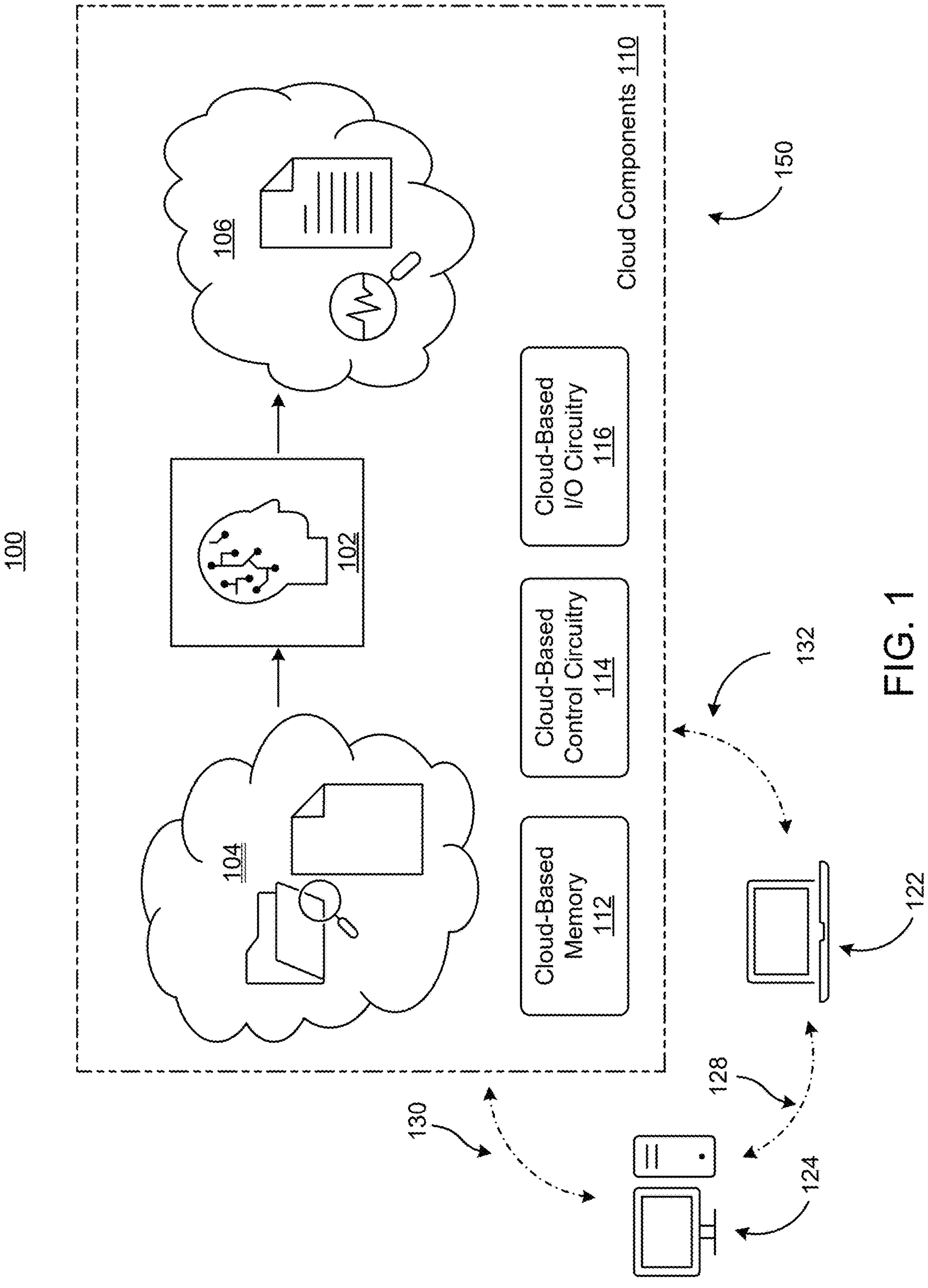
FIG. 1 shows an illustrative system for configuring a classification model to determine a context source of an artificial intelligence model output, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Large language models (LLMs) have achieved state-of-the-art (SOTA) performance across a wide range of natural language processing (NLP) tasks, including question-answering, summarization, and code generation. Their ability to process and generate human-like text has made them an essential tool in a variety of applications, including knowledge-intensive applications.

Despite their growing popularity and success, LLMs are inherently limited by the knowledge they acquire during pre-training, which can become outdated in real time or incomplete for domain-specific applications. To mitigate this issue, as well as others, Retrieval Augmented Generation (RAG) has emerged as a powerful technique that enhances LLMs by incorporating external knowledge sources. Instead of relying solely on their pre-trained memory, RAG-equipped models can retrieve relevant context from a knowledge base. Their responses can be grounded in the information provided in the context. In some embodiments, the steps involved in generating an answer for a question may follow three processes: (i) extraction, (ii) fine-reading, and (iii) summarization. This approach can improve model accuracy as well as ensure that the QA system can be adapted to Open-QA settings. However, RAG-based LLMs can still generate incorrect or inconsistent responses, even if the retrieved information is relevant and accurate. This can raise concerns about LLM reliability, such as, for example, in high-stakes environments.

One popular line of research has been to utilize autoregressive features such as output logits to uncover hidden features of a generated output. For example, some techniques compare the log probability of the original sample and a perturbed sample to detect whether the generated texts are from an LLM or a human. This signaled that logits could have significant discernibility with regard to key information that cannot be easily obtained from the text itself. Similarly, other techniques estimate uncertainty in LLM by using semantic entropy to quantify the uncertainty from multiple LLM generated outputs from the same input. Additional techniques integrate new scoring functions into uncertainty estimation methods to improve the overall uncertainty estimation. These methods usually require multiple runs through large language models, which increases costs and makes it challenging to scale. Still other techniques use a separate classifier to estimate the output of an LLM. Different from the unsupervised feature extraction, these techniques use features from an LLM and an additional dataset to train a classifier. Other techniques have also illustrated that using a value head on top of an LLM can be an effective predictor of the LLM's confidence in its answer. Still more techniques explored deeper into where knowledge is actually stored in a transformer's architecture. While the theory of knowledge neurons has been defined by using gradients of neurons, certain research found that the activation of such knowledge neurons is positively correlated to the related facts. These techniques illustrate that neurons exhibit knowledge behavior and motivate looking beyond output logits and into the architecture of LLMs themselves. However, these techniques focus on the interpretability aspect and do not propose ways to be indicative of the desired property of a generated output.

Based on the technical problems described above, described herein are technical solutions to the technical problems, as well as others, that identifies whether an LLM generated response is generated from the LLM's memory (alone) or from the given context, or both. A technical benefit of this technical solution is that the LLM generated output can be provided with greater confidence as being authentic while also flagging when the generated output (e.g., RAG output) conflicts with the input context given to the LLM. In particular, the described techniques model internal activations of an LLM while generating answer tokens, capturing richer information beyond that of the output logits.

FIG. 1 shows illustrative components for classifying LLM outputs as adhering to pre-trained memory or a provided context, in accordance with one or more embodiments. As shown in FIG. 1, system 100 may include mobile device 122 and user terminal 124. While shown as a smartphone and personal computer, respectively, in FIG. 1, it should be noted that mobile device 122 and user terminal 124 may be any computing device, including, but not limited to, a laptop computer, a tablet computer, a hand-held computer, and other computer equipment (e.g., a server), including "smart," wireless, wearable, and/or mobile devices. FIG. 1 also includes cloud components 110. Cloud components 110 may alternatively be any computing device as described above, and may include any type of mobile terminal, fixed terminal, or other device. For example, cloud components 110 may be implemented as a cloud computing system and may feature one or more component devices. For example, cloud components 110 may include cloud-based memory 112, cloud-based control circuitry 114, cloud-based I/O circuitry, or other components.

It should also be noted that system 100 is not limited to three devices. Users may, for instance, utilize one or more devices to interact with one another, one or more servers, or other components of system 100. It should be noted, that, while one or more operations are described herein as being performed by particular components of system 100, these operations may, in some embodiments, be performed by other components of system 100. As an example, while one or more operations are described herein as being performed by components of mobile device 122, these operations may, in some embodiments, be performed by components of cloud components 110. In some embodiments, the various computers and systems described herein may include one or more computing devices that are programmed to perform the described functions. Additionally, or alternatively, multiple users may interact with system 100 and/or one or more components of system 100. For example, in one embodiment, a first user and a second user may interact with system 100 using two different components.

With respect to the components of mobile device 122, user terminal 124, and cloud components 110, each may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 1, both mobile device 122 and user terminal 124 include a display upon which to display data (e.g., conversational response, queries, and/or notifications). As an illustrative example, cloud components 110 may include cloud-based memory 112, cloud-based control circuitry 114, cloud-based I/O circuitry 116, and the like.

Cloud-based memory 112 may be configured to store and/or manage data on one or more remote servers (e.g., databases). Cloud-based memory 112 may also include local databases (i.e., databases managed by a same server or servers as the other cloud components. This setup allows data to be accessed from anywhere so long as network access is available. When data is uploaded to cloud-based memory, it can be saved on virtual machines within physical servers located in data centers, which can reside in various geographical regions. To ensure availability and redundancy, cloud components 110 can often distribute data across multiple servers and regions. This means that if one server fails, the data can still be accessed from another server. Cloud-based memory 112 can include such other data stored on other servers and/or metadata indicating the data stored by these other servers. By leveraging cloud-based memory 112, the need for extensive on-site infrastructure can be reduced, moving expenses from capital expenditure to operational expenditure.

In some examples, cloud-based memory 112 may be configured to store a large language model and a classification model. The large language model and the classification model may, for example, be stored in a model database. Upon request, an instance of the large language model and the classification model can be retrieved. The large language model stored by cloud-based memory 112 may be trained to generate responses to input prompts. The classification model stored by cloud-based memory 112 may be trained to input extracted token activations of an output layer of the large language model. These token activations correspond to answers responding to prompts input to the large language model. The classification model may be configured to determine, based on the token activations (i.e., token activations being input to the classification model), whether the large language model generated the answers using context included in the input prompts or model memory.

In some examples, cloud-based memory 112 may be configured to store a first large language model and a classification model. The first large language model may, for example, be trained to output token activations of a first output layer of the first large language model during generation of answers to input prompts. In some embodiments, the answer may be answers generated using a second large language model different from the first. For example, the second large language model may be an external model (e.g., external to system 100), and access to token activations of the second large language model may not be available. In this example, the prompt provided to the second large language model, along with the answer generated by the second large language model in response to the prompt, can be provided to the first large language model. The first large language model, which grants access to the token activations of its final layer, can reconstruct the answer given the same input and the token activations associated with the first large language model generating the answer can be determined.

The classification model stored by cloud-based memory 112, in the example embodiment, may be trained to determine, based on the extracted token activations, whether the second large language model generates the answers using context corresponding to the input prompts or using model memory of the second large language model. In other words, the token activations from the first large language model, of which token activations are accessible, associated with the generated answer can be used to represent the token activations of the second large language model, of which token activations are not accessible.

In some embodiments, cloud-based memory 112 may further be configured to store a plurality of sample large language model prompts. Each sample large language model prompt may include a sample query and a sample context. In some embodiments, the sample large language model prompts may be curated from various data sources, such as the Natural Questions (NQ) dataset, the SQUAD dataset, the TriviaQA dataset, the BioASQ dataset, and the Relation Extraction dataset. Additionally, data sources, or alternative data sources, can be used, and the aforementioned are exemplary. The Natural Questions (NQ) dataset is a large-scale benchmark created by Google that contains real user queries from Google Search paired with corresponding Wikipedia articles. Each example includes a question (e.g., query (Q)), a long passage (e.g., context (C)), and short annotated answer (e.g., answer (A)). The Stanford Question Answering Dataset (SQUAD) includes questions posed on Wikipedia articles where the answers are text spans found within the corresponding passages. The TriviaQA dataset refers to a large-scale reading comprehension benchmark including over 650,000 question-answer-evidence triplet. The TriviaQA dataset includes approximately 95,000 question-answer pairs accompanied by multiple independently gathered evidence documents. The BioASQ dataset includes biomedical-related question answering. This includes English-language questions crafted by biomedical experts paired with gold-standard answers (e.g., an “optimal” or “ideal” answer) and supporting materials such as relevant documents, snippets, and ontology concepts. The relation extraction datasets are designed to identify and classify semantic relationships between entities within text. These datasets can be used to develop and evaluate models in tasks like knowledge base construction and information retrieval.

Cloud-based control circuitry 114 may be configured to execute instructions to effectuate one or more operations such as, for example, determining whether a large language model generated, in response to a prompt including a query and a context, an answer based on the context or model memory of the large model.

LLM With Accessible Token Activations

If a final layer of the target LLM is accessible, then the token activations from the final layer can be extracted. In some embodiments, cloud-based control circuitry 114 may be configured to receive, from a client device (e.g., mobile device 122, user terminal 124), an input prompt including a query and a context. Cloud-based control circuitry 114, in this example, may be configured to generate, using the large language model, an answer to the query. Cloud-based control circuitry 114 can extract a set of token activations from an output (e.g., final) layer of the large language model while generating the answer. The set of token activations may then be input to the classification model to obtain a label indicating whether the answer was generated using the context or the model memory. Cloud-based control circuitry 114 may further be configured to generate and assign a flag to the answer based on the label. The flag, for example, can indicate whether the answer generated by the large language model was based on the context provided within the input prompt to the large language model or based on model memory.

LLM Without Accessible Token Activations

If a final layer of the target LLM is not accessible, then the token activations of the final layer can be modeled using another, similar model for which the final layer is accessible. This can, in some examples, be the LLM with accessible token activations mentioned above. Cloud-based control circuitry 114, in this example, can receive, from a client device (e.g., mobile device 122, user terminal 124), a request to determine whether an answer, generated by a second large language model (i.e., the LLM without accessible token activations) in response to an input prompt including a query and a context, is based on the context included in the input prompt or the model memory of the second large language model. Cloud-based control circuitry 114 may be configured to input, to the first large language model (e.g., the LLM with accessible token activations), (a) the input prompt including the query and the context and (b) the answer generated by the second large language model in response to the input prompt to extract, from the first output layer of the first large language model, a set of token activations associated with the first large language model generating the answer. Cloud-based control circuitry 114 can input this set of token activations to the classification model to obtain a label indicating whether, based on the set of token activations (extracted from the first large language model), the second large language model generated the answer using the context of the input prompt or its model memory. Cloud-based control circuitry 114 may be configured to generate and assign a flag to the answer based on the label.

Training Data Generation and Classification Model Training

In some embodiments, cloud-based control circuitry 114 may be configured to generate training data to train a classification model, as well as train, using the generated training data, the classification model to predict whether a large language model generated, in response to a prompt including a query and a context, an answer based on the context or model memory associated with the large language model. In some examples, cloud-based control circuitry 114 may be configured to generate training data to train a classification model to determine a source of an answer generated by a trained large language model. The training data may include a plurality of sample sets of token activations and a plurality of reference labels. Each sample set of token activations may be associated with a corresponding answer generated by the trained large language model responding to a corresponding sample large language model prompt that is input to the trained large language model. The reference labels (e.g., serving as ground truth) respectively may indicate whether the trained large language model generated the corresponding answer based on (a) a corresponding sample large language model context of the corresponding sample large language model prompt or (b) model memory of the trained large language model.

Moreover, to generate the training data, cloud-based control circuitry 114 may be configured, for some or all of the sample large language model prompts, to input the query and the context of the corresponding sample large language model prompt into the trained large language model to obtain a first answer. Cloud-based control circuitry 114, in this example, may be configured to generate a perturbated first answer and a perturbated context by applying a perturbation to the first answer such that the perturbated context includes the perturbated first answer in lieu of the first answer. Cloud-based control circuitry 114 may further be configured to input the query and the perturbated context into the trained large language model to obtain a second answer. A similarity score, representing a similarity of the perturbated first answer and the second answer, may be computed and used by cloud-based control circuitry 114 to determine a label to assign to the second answer. For example, the label may include (i) a first value based on the similarity score being greater than a first threshold indicative of the trained large language model using the perturbated context to generate the second answer or (ii) a second value based on the similarity score being less than a second threshold indicative of the trained large language model using model memory to generate the second answer. Cloud-based control circuitry 114 may extract, from an output layer of the trained large language model, a sample set of token activations associated with the trained large language model generating the second answer based on the query and the perturbated context. The training data, for example, can include a training sample comprising the sample set of token activations and the label. The training data can include other training samples including token activations and labels, which can be created in a similar manner. Cloud-based control circuitry 114 may be configured to train, using the training data, the large language model classification model. For example, the trained classification model can determine, for a given query-context-answer triplet, whether the answer generated by a large language model (or other AI model) is based on the context provided as input to the large language model or model memory (e.g., training information).

Cloud-based I/O circuitry 116 may be configured to display, using a graphical user interface rendered on the client device, a response comprising the answer with the label. Cloud-based I/O circuitry 116 may be configured to display, using a graphical user interface, in response to an input prompt comprising a sample query and sample context provided to the trained large language model, a response to the input prompt. The displayed response can include a sample answer generated by the trained large language model and a flag indicating whether the trained large language model generated the sample answer using the sample context or the model memory.

Additionally, as mobile device 122 and user terminal 124 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 100 may run an application (or another suitable program). The application may cause the processors and/or control circuitry to perform operations related to generating dynamic conversational replies, queries, and/or notifications.

Each of these devices may also include electronic storage. The electronic storage may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes communication paths 128, 130, and 132. Communication paths 128, 130, and 132 may include the Internet, a mobile phone network, a mobile voice, or data network (e.g., a 5G or LTE network), a cable network, a public switched telephone network, or other types of communications networks or combinations of communications networks. Communication paths 128, 130, and 132 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 110 may include a model 102, which may be a machine learning model (e.g., an LLM, a classification model, a combination of a classification model and an LLM, etc.). In some embodiments, model 102 can represent a classification model to be trained to determine whether an LLM-generated answer was based on context input to the LLM or model memory. Model 102 may take inputs 104 and provide outputs 106. Inputs 104 may include multiple datasets, such as a training dataset (e.g., training labeled token activations), test datasets (e.g., test labeled token activations), validation datasets (e.g., validation labeled token activations), or other information. In some embodiments, outputs 106 may be fed back to model 102 as input to train model 102 (e.g., alone or in conjunction with user indications of the accuracy of outputs 106, labels associated with the inputs, or with other reference feedback information). The system may receive a first labeled feature input, wherein the first labeled feature input is labeled with a known prediction for the first labeled feature input. The system may then train the first machine learning model to classify the first labeled feature input with the known prediction. For example, the system may receive a set of token activations, where the set of token activations is labeled to indicate whether the answer was generated using context or memory. The system may then train the first machine learning model to classify the set of token activations with the corresponding flag In some embodiments, inputs 104 and outputs 106 can represent different data depending on a model type of model 102. For example, for model 102 referring to an LLM, inputs 104 may include input prompts, which may include queries and contexts. For example, an example input prompt (e.g., of inputs 104) can include a query and a context. The input prompt can be input to model 102, which may be configured to generate an answer to the query. In some embodiments, outputs 106 can include the answer, the query-context-answer (QCA) triplet, and/or the token activations associated with model 102 generating the answer. In this example, a final layer of model 102 (e.g., a final transformer layer, including a self-attention layer and a feed forward layer) may be accessible, allowing the token activations to be extracted.

In some examples, however, the token activations for a given model may not be available. In this scenario, model 102 can refer to another AI model, which can be of a same or similar model type as the model with which token activations are not accessible. Inputs 104 may include the input prompts and the answers produced by another AI model based on the input prompts. Outputs 106 may include the token activations extracted from the final layer of model 102 (e.g., model 102 determines the token activations used by the other AI model to create that answer based on those inputs).

In some embodiments, model 102 can correspond to a classification model. In such examples, the datasets (e.g., inputs 104) can include data related to a QCA triplet. During training, these QCA triplets can be used to create perturbated QCA triplets, and token activation can be extracted from a final layer of a token-accessible model and labeled to indicate whether the model used the perturbated context to respond to the query or model memory. In some embodiments, the datasets (e.g., inputs 104) can include labeled token activations. For example, inputs 104 can include token activations associated with answers generated by an artificial intelligence model (e.g., an LLM), and can also include labels indicating whether those answers were generated by the artificial intelligence model using the provided context or model memory. In some embodiments, outputs 106 may be fed back to model 102 as input to train model 102 (e.g., alone or in conjunction with user indications of the accuracy of outputs 106, labels associated with the inputs, or with other reference feedback information). For example, system 100 may receive a first labeled input including a first set of token activations and a first label indicating whether the first set of token activations correspond to an answer generated by an LLM using provided context or model memory. The first labeled input is labeled with a known prediction (e.g., ground truth) for the first labeled input. Model 102 can be trained to classify the first labeled feature input with the known prediction.

In a variety of embodiments, model 102 may update its configurations (e.g., weights, biases, or other parameters) based on the assessment of its prediction (e.g., outputs 106) and reference feedback information (e.g., user indication of accuracy, reference labels, or other information). In an example, where model 102 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 102 may be trained to generate better predictions.

In some embodiments, model 102 may include an artificial neural network. In such embodiments, model 102 may include an input layer and one or more hidden layers. Each neural unit of model 102 may be connected with many other neural units of model 102. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 102 may be self-learning and trained, rather than explicitly programmed, and can perform significantly better in certain areas of problem solving, as compared to traditional computer programs. During training, an output layer of model 102 may correspond to a classification of model 102, and an input known to correspond to that classification may be input into an input layer of model 102 during training. During testing, an input without a known classification may be input into the input layer, and a determined classification may be output.

In some embodiments, model 102 may include multiple layers (e.g., where a signal path traverses from front layers to back layers). In some embodiments, back propagation techniques may be utilized by model 102 where forward stimulation is used to reset weights on the "front" neural units. In some embodiments, stimulation and inhibition for model 102 may be more free-flowing, with connections interacting in a more chaotic and complex fashion. During testing, an output layer of model 102 may indicate whether or not a given input corresponds to a classification of model 102.

In some embodiments, model 102 may be a Large Language Model (LLM). An LLM refers to a type of deep learning model configured to process and generate human-like text, images, video, code, or other content, by leveraging vast amounts of data. LLMs typically have a transformer architecture. This allows the LLM to efficiently handle long-range dependencies in text, events, images, or other input (e.g., sequential) data, through mechanisms like self-attention and positional encodings. LLMs can be trained on massive corpora of text, amongst other forms of data, using unsupervised learning, often via masked language modeling (MLM) or causal language modeling (CLM). In these techniques, the model can learn to predict missing tokens in a sequence or next tokens in a sequence. As an example, the model can represent words and phrases as high-dimensional vector embeddings to capture semantic relationships and contextual meanings. During inference, LLMs can generate responses token by token based on probabilistic predictions. LLMs can form the responses using techniques including, but not limited to, temperature scaling, beam search, nucleus sampling, or others, or combinations thereof, to control fluency and coherence. Due to their scale, LLMs can consume a significant quantity of computational resources, including specialized hardware like GPUs and TPUs, and are generally fine-tuned for specific tasks (e.g., question-answering, summarization, code generation, etc.).

In some embodiments, the LLM may include a plurality of layers (e.g., transformer layers). At least a final layer of the LLM may include a self-attention layer and a feed forward layer. The token activations can be extracted from the feed forward layer.

In some embodiments, the model (e.g., model 102) may automatically perform actions based on outputs 106. In some embodiments, the model (e.g., model 102) may not perform any actions.

In some embodiments, model 102 may be a classification model including a long-short term memory (LSTM) model and a classification head (e.g., classifier). LSTM models can process sequential data through a series of gates and memory cells to capture long-term dependencies and patterns. The output of the LSTM model can then be passed through a classifier, which may include a fully connected layer and a SoftMax layer that generates the final prediction.

System 100 also includes API layer 150. API layer 150 may allow the system to generate summaries across different devices. In some embodiments, API layer 150 may be implemented on mobile device 122 or user terminal 124. Alternatively, or additionally, API layer 150 may reside on one or more of cloud components 110. API layer 150 (which may be A REST or Web services API layer) may provide a decoupled interface to data and/or functionality of one or more applications. API layer 150 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 150 may use various architectural arrangements. For example, system 100 may be partially based on API layer 150, such that there is strong adoption of SOAP and RESTful Web-services, using resources like Service Repository and Developer Portal, but with low governance, standardization, and separation of concerns. Alternatively, system 100 may be fully based on API layer 150, such that separation of concerns between layers like API layer 150, services, and applications are in place.

In some embodiments, the system architecture may use a microservice approach. Such systems may use two types of layers: Front-End Layer and Back-End Layer where microservices reside. In this kind of architecture, the role of the API layer 150 may provide integration between Front-End and Back-End. In such cases, API layer 150 may use RESTful APIs (exposition to front-end or even communication between microservices). API layer 150 may use AMQP (e.g., Kafka, RabbitMQ, etc.). API layer 150 may use incipient usage of new communications protocols such as gRPC, Thrift, etc.

In some embodiments, the system architecture may use an open API approach. In such cases, API layer 150 may use commercial or open source API Platforms and their modules. API layer 150 may use a developer portal. API layer 150 may use strong security constraints applying WAF and DDOS protection, and API layer 150 may use RESTful APIs as standard for external integration. Additionally, persons of ordinary skill in the art will recognize that graph-based systems may be used and, in such scenarios, Graph APIs may be used instead of or in addition to RESTful APIs (e.g., GraphQL).

An Application-Specific Integrated Circuit (ASIC) is a specialized hardware chip designed to perform a specific task or set of tasks with high efficiency. Unlike general-purpose processors, such as CPUs or GPUs, ASICs are custom-built for particular applications, optimizing performance, power consumption, and area efficiency. ASICs are widely used in areas such as cryptocurrency mining, telecommunications, and artificial intelligence (AI), where dedicated hardware can provide significant advantages over more flexible but less efficient alternatives. Implementing a large AI model in an ASIC requires designing custom circuits that accelerate the model's computations while ensuring efficient memory management and data movement. Because AI models, particularly deep learning networks (e.g., model 102), can involve extensive matrix multiplications and tensor operations, specialized hardware units such as systolic arrays or tensor processing units (TPUs) can be integrated to optimize these operations. To overcome this challenge, system 100 may use weight quantization, memory hierarchy optimization, and on-chip interconnects to improve throughput and reduce power consumption. To accommodate large models, such as LLMs, system 100 may integrate high-bandwidth memory (HBM) or leverage chiplet architectures, where multiple ASICs work together in a modular fashion to process different portions of the model (e.g., model 102).

Training AI models on an ASIC presents significant challenges since training involves dynamic weight updates and high computational flexibility, which contrasts with the fixed nature of ASICs. To do so, system 100 may use field-programmable gate arrays (FPGAs) or GPUs during the training phase, then transfer the trained model weights to the ASIC for inference. Alternatively, system 100 may design ASICs that support on-chip fine-tuning or low-bit precision training, allowing for limited retraining directly on the device. Additionally, co-designing hardware and algorithms ensures that the model architecture is tailored to the ASIC's capabilities, reducing inefficiencies and maximizing performance. By integrating specialized training accelerators, approximate computing methods, and efficient dataflow architectures, ASICs can be optimized for both training and inference, enabling large AI models, such as LLMs, to operate with minimal energy and latency constraints.

As referred to herein, a system (e.g., system 100) may refer to a network of interconnected computers and other devices that are linked together to share resources, information, and services. These networks can be established using various technologies and configurations, allowing devices to communicate and exchange data with each other. In some embodiments, system 100 may comprise a network for financial services. The components of system 100 may be configured to support the operations and services provided by a service provider, which, for example, may correspond to a financial service firm and/or the financial industry. Therefore, the network infrastructure of system 100 may enable transactions to be processed efficiently and securely. This includes services like online banking, wire transfers, trading platforms for stocks and securities, electronic fund transfers, and other financial transactions. For example, financial firms often require connectivity to various financial markets, exchanges, and data providers. The network infrastructure allows access to real-time market data, trade execution platforms, and connections to external financial systems. For example, service providers can be accessed by a client device to perform one or more financially-related services.

In some embodiments, system 100 and/or service providers may form some or all of a global payment network that facilitate credit and debit card transactions. The network may connect issuing banks, acquiring banks, merchants, and cardholders, enabling electronic payments at point-of-sale terminals and online. In some embodiments, system 100 may include an Automated Clearing House (ACH), which refers to a network used for electronic fund transfers and direct deposits in the United States. ACH can enable the processing of large volumes of credit and debit transactions, including payroll deposits, bill payments, and person-to-person transfers. In some embodiments, the computer network may comprise a SWIFT (Society for Worldwide Interbank Financial Telecommunication) network. SWIFT is a global messaging network used by financial institutions for secure communication and the transfer of financial messages, particularly for international transactions and cross-border payments. In some embodiments, the computer network may comprise a blockchain network.

Figure 2:
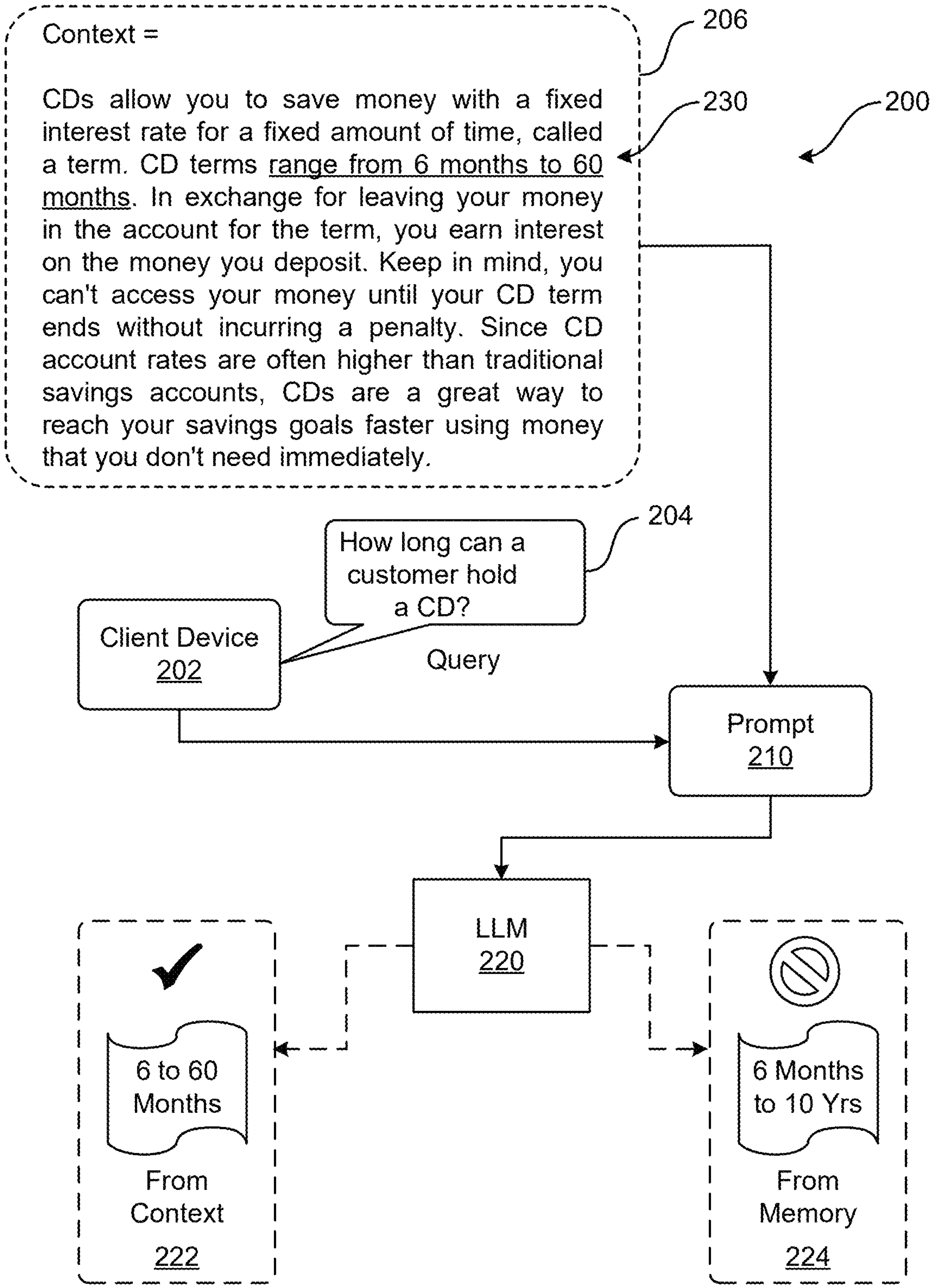
FIG. 2 shows an illustrative example of an LLM responding from context and memory, in accordance with one or more embodiments.

FIG. 2 shows an illustrative example of an LLM responding from context and memory, in accordance with one or more embodiments. In some embodiments, modeling these distinct processes into a single model, specifically the last two components (e.g., the fine-reading and summarization) are completely given to the LLMs (e.g., LLM 220), whereas there is flexibility with how retrieval is done, for example, in retrieving the relevant content from open-domain sources (e.g., KBs, web, etc.). The techniques described herein refer to the fine-reading and summarization components. As an example, it is assumed that the right context is already provided to the LLM (e.g., LLM 220).

As detailed above, example system 200 can include a prompt 210 provided to LLM 220 to generate an answer 222 or an answer 224. In some examples, LLM 220 can be implemented using model 102. Prompt 210 can be generated, formed, and/or submitted by a client device 202. For example, client device 202 can be implemented using mobile device 122, user terminal 124, cloud components 110, or other aspects of system 100, or combinations thereof. Prompt 210 can include a query 204 and a context 206. For example, query 204 can include a question: "How long can a customer hold a CD?" Context 206 can include at least one recitation of an expected answer 230 (e.g., ground truth) to query 204. For example, context 206 can include expected answer 230 (e.g., CD terms "range from 6 months to 60 months"). Thus, if LLM 220 responds to prompt 210 using context 206, answer 222 would likely be output (e.g., "A customer can hold a CD from 6 to 60 months"). However, if LLM 220 does not use context 206, answer 224 may be output, which uses information other than context 206 (e.g., "A customer can hold a CD from 6 months to 10 years"). As a result, answer 222 would be a correct answer as it aligns with context 206 more than answer 224, which would be an incorrect answer.

Advanced architectures and increasing parameter space of LLMs, as well as the trillion token corpus on which they are trained, have shown greater emerging capabilities for LLMs. Also, shown has been the increased memorization/preference or patterns of preference/personality that make LLMs prefer to use information from memory rather than from the input context. Specifically, the fine-reading component of LLMs, which can be measured based on, for example, entropy in a black-box setting, can be unreliable at measuring the internal state of the LLM. Put simply, because the LLM has already learned certain facts from another source it may not show any change in confusion parameters when given a different/contradictory information.

In some examples, entailment-based hallucination detection models, where a black-box model is trained to identify if there is hallucination in target model based on the input and generated output of target model, may be used. These hallucination detection models are not privy to the internals of the target model. In specialized domains (e.g., security, healthcare, finance and banking, private), where general knowledge lacks the specificity and variability of specific statutes and guidelines, it is strict entailment that matters, and factual correctness is codified in the input.

Entailment refers to the logical relationship between statements where one statement necessarily follows from another, ensuring that if the first statement is true, the second must also be true. Identifying entailment is an important source for correctness, but also having a high degree of certainty that context is used in generating the output is important for sensitive domains. For example, the Hughes Hallucination Evaluation Model (HHEM) methodology is completely blind to the internal workings of the target model and any conclusion of hallucination is based on entailment. Hallucination is not detected if the model has completely not paid attention to the context and generated the answer only from memory.

A measure to guarantee that the response is generated after considering all the complex and rich variations of information given in the context, and not just from memory, can improve, possibly significantly, trust in the responses of LLMs. Quantifying robustness in generation of outputs for LLMs include:

Context Fidelity: A measure to ensure that output strictly adheres to the input context. Error Resilience: A measure to digest noise in the given input.

Consistency: Semantically similar responses to similar input context.

Generalization: Reasoning based on the given context with reasonable expansion to general knowledge learned in pre-training.

Table 1 below illustrates example notations used within the following description.

TABLE 1

| Symbol | Meaning |
|---|---|
| BM | Base Model |
| TM | Target Model |
| RR | Random Replacement |
| NRR | Near Relevant Replacement |
| Q | Query |
| A | Answer |
| C | Context |
| PC | Perturbated Context |
| PA | Perturbated Answer |

Described herein are systems, methods, and programming reflecting technical solutions that identify whether a response from an artificial intelligence model, such as an LLM, is based on the input context or pre-trained memory.

Retrieval augmented generation (RAG) models have become a standard practice to ground large language model outputs to its context. However, technical problems exist in that RAG model outputs can be untrustworthy. Existing solutions can also exacerbate and increase technical problems.

For instance, to make the RAG model output more trustworthy, techniques have been proposed to better understand the RAG models' uncertainty and/or confidence of generated outputs and its relationship to the pre-training and test-time knowledge. While it is possible to allow the LLM to generate such information along with the pre-existing answers, or have another LLM as a judge, LLMs can be overconfident, which can result in a biased uncertainty estimation.

One technique used has included utilizing autoregressive features, such as output logits, to uncover hidden features of a generated output. For example, some techniques compare the log probability of the original sample and a perturbed sample to detect whether the generated texts are from an LLM or a human. This indicated that logits could have significant discernibility with regard to key information that cannot be easily obtained from the text itself. To estimate uncertainty in LLM, semantic entropy can be used to quantify the uncertainty from multiple LLM generated outputs from the same input. New scoring functions can also be integrated, such as, for example Meaning-Aware Response Scoring (MARS) and Learnable Response Scoring Function (LARS), into uncertainty estimation methods that can improve the overall uncertainty estimation. However, these methods usually require multiple runs through LLMs, which can increase costs and make it more difficult to scale. Another technique can use a separate classifier to estimate the output of the LLM. Different from the unsupervised feature extraction, these methods use features from an LLM and an additional dataset to train the classifier. Still other techniques use a value head on top of an LLM as an effective predictor of the model's confidence in its answer.

Other techniques look deeper into where knowledge is actually stored in a transformer's architecture. The theory of knowledge neurons has been defined by using gradients of neurons; however, the activation of such knowledge neurons has been indicated as being positively correlated to the related facts. Some techniques use causal interventions on the input and analyze the causal trace of weights. These techniques showed that neurons exhibit knowledge behavior, and the necessity to look beyond output logits and into the architecture of the LLM itself. These techniques, however, have been focused more towards the interpretability aspect and do not propose any process to be indicative of the desired property of generated output.

Described herein are technical solutions to the aforementioned technical problems, which include determining whether a generated response from an artificial intelligence model (e.g., an LLM) comes from the artificial intelligence model's memory (e.g., memory of the LLM) or the given context (e.g., from the input prompt). These solutions contribute to the technical benefit of increasing the confidence in a non-subjective way of the generated model, especially when the RAG retrieved output conflicts with the context. The described solutions further include uses beyond the output logit, including utilizing the output of the activation function of the last layer of an LLM.

In some embodiments, to train a classification model to determine if an answer was generated from context or memory, system 100 may be configured to create a dataset with altered answers within the context. This process can be referred to as "controlled conflicts." In an open-QA setting, system 100 can provide the context including a modified answer. System 100 can expect the LLM (e.g., model 102) to produce an answer from the perturbated context. The perturbated answer may be created by replacing the actual answer using one or more techniques, including, for example:

Random Replacement (RR): Random word replacement of target answer inside context.

Near Relevant Replacement (NRR): Near relevant entity from the same named entity family (NER) based on a Knowledge Graph.

Figure 3:
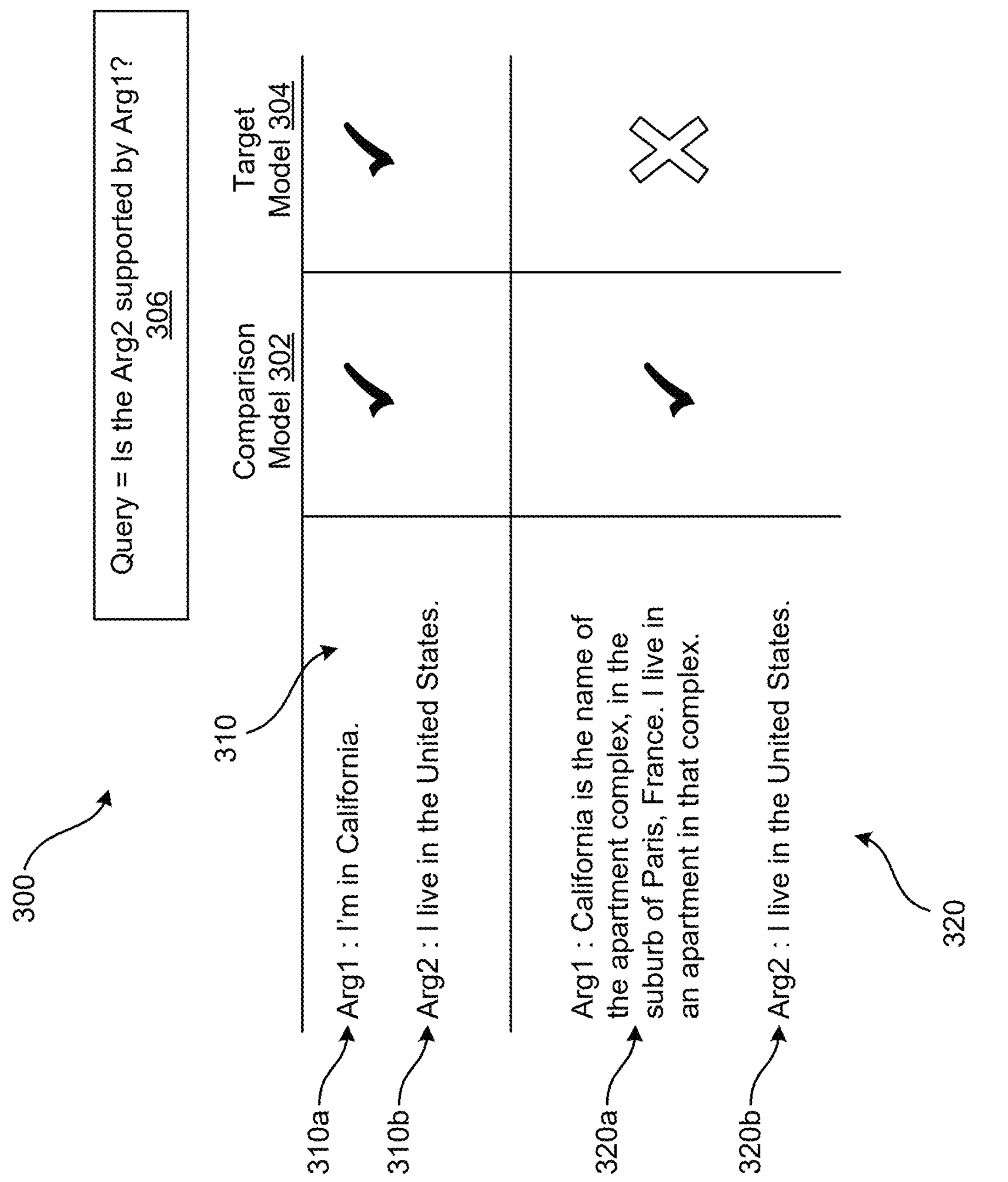
FIG. 3 shows an illustrative diagram of a comparison of an example LLM compared with an existing hallucination detection model, in accordance with one or more embodiments.

FIG. 3 shows an illustrative diagram of a comparison 300 of an example LLM compared with an existing hallucination detection model, in accordance with one or more embodiments. In some embodiments, FIG. 3 describes a process that can be followed to create the dataset. For a given query (Q), context (C), and answer (A), from various datasets used to train and evaluate models (e.g., the data sets SQUAD, NQ, and MRQA, used to train and evaluate models on the reading comprehension tasks), the context can be perturbed to create a perturbated context (RC). System 100 can perform the perturbation using various retrieval-based performance evaluation techniques (e.g., Reciprocal Rank (RR), Normalized Reciprocal Rank (NRR)). The query (Q) and perturbated context (RC) may be given as an input to target LLM. If the target LLM produces the original answer (A) in spite of being provided with perturbated context (RC), system 100 may indicate that the predicted answer was produced from memory of the target model. If the target model produces the perturbated answer (RA), then system 100 can indicate that the answer is produced from context. For simplicity, outputs produced by the target model that are not present in the original (C) and the perturbated context (RC) can be discarded. During the creation of the train and test corpora (e.g., for NRR), for each data-point, system 100 may be configured to randomly sample answers (e.g., three answers) in the same entity type from the corpus.

In some embodiments, comparison 300 of FIG. 3 relates to a hallucination detection model. An example hallucination detection model includes the HHEM 2.1 model. The HHEM 2.1 model refers to an advanced hallucination detection model developed that assesses the factual consistency of LLM outputs. As an illustrative example, comparison 300 of FIG. 3 illustrates two sets of arguments, set 310 and set 320, and how a comparison model 302 and a target model 304 handle a query 306-"Is the second argument (Arg2) supported by the first argument (Arg1)." In other words, comparison 300 represents an entailment analysis to determining logical relationships between the arguments.

Set 310 includes a first argument (Arg1) 310*a* and a second argument (Arg2) 310*b*. For example, first argument (Arg1) 310*a* may be the statement "I'm in California," and second argument (Arg2) 310*b* may be the statement "I live in the United States." Model 302 and model 304 can analyze query 306 using arguments 310*a*, 310*b* from set 310 as context. In other words, model 302 and model 304 can determine whether argument 310*b*, "I live in the United States," is supported by argument 310*a*, "I'm in California." As illustrated in comparison 300 of FIG. 3, for set 310, both model 302 and model 304 may determine that argument 310*b* is supported by argument 310*a*.

Set 320 includes a first argument (Arg1) 320*a* and a second argument (Arg2) 320*b*. For example, first argument (Arg1) 320*a* may be the statement "California is the name of the apartment complex, in the suburb of Paris, France. I live in an apartment in that complex." Second argument (Arg2) 320*b* may be the statement "I live in the United States." Model 302 and model 304 can analyze query 306 using arguments 320*a*, 320*b* from set 320 as context. In other words, model 302 and model 304 can determine whether argument 320*b*, "I live in the United States," is supported by argument 320*a*, "California is the name of the apartment complex, in the suburb of Paris, France. I live in an apartment in that complex." As illustrated in comparison 300 of FIG. 3, for set 320, model 302 may determine that argument 320*b* is supported by argument 320*a*, whereas model 304 may correctly determine that argument 320*b* is not supported by argument 320*a*.

In some embodiments, one or more measures/metrics may be used to judge whether, for a given rigged context RC (e.g., perturbated context), the answer matched the original answer (A) or the perturbated answer. For example, a framework for evaluating machine-generated answers in question answering (QA) tasks may be used. One example of such a process includes Precise Answer Normalizations (PEDANTS). In such examples, rubrics from the trivia community, such as NAQT and Jeopardy!, may be adopted, providing a more stable and effective evaluation for diverse QA datasets.

Corpus

Various datasets can be used to create a base corpora used to create the training and test data. For example, the SQUAD 1.0 dataset, NQ dataset, TriviaQA dataset, BioASQ dataset, and relation extraction dataset can be used to create the training and test data. SQUAD 1.0 refers to a dataset for question answering based on reading comprehension of Wikipedia articles. NQ refers to a dataset including real-world Google search questions with answers from Wikipedia. TriviaQA refers to a dataset that provides trivia-based questions with answers from web documents. BioASQ refers to a dataset focused on biomedical question answering, pulling from scientific literature. Finally, Relation Extraction refers to a dataset that targets extracting relationships between entities in text for NLP tasks. In some embodiments, the datasets can be used to generate training prompts, which can include training queries and training contexts. These datasets can be used to generate training answers (i.e., responding respectively to the training prompts). In some embodiments, the datasets stored and/or created may include a query-context-answer (QCA) triplet. For example, a plurality of QCA triplets can be used to determine a corresponding plurality of perturbated QCA triplets, and those perturbated QCA triplets can be used to generate labeled token activations for training a classification model.

Table 2 below illustrates test model performance on the Dev or Test split for the TriviaQA, SQUAD, BioASQ, and RelationalExtraction datasets. For each dataset, two versions may be created based on either knowledge-based perturbation or random words perturbation.

TABLE 2

| Dataset | Labeling | M(0) | C (1) |
|---|---|---|---|
| TriviaQA (Dev) | KG | 1225 | 2589 |
| | R | 1837 | 1929 |
| SQuAD (Dev) | KG | 835 | 3907 |
| | R | 1346 | 2580 |
| BioASQ (Test) | KG | 309 | 431 |
| | R | 374 | 345 |
| Rel. Ext. (Test) | KG | 263 | 1493 |
| | R | 548 | 758 |

Figure 4:
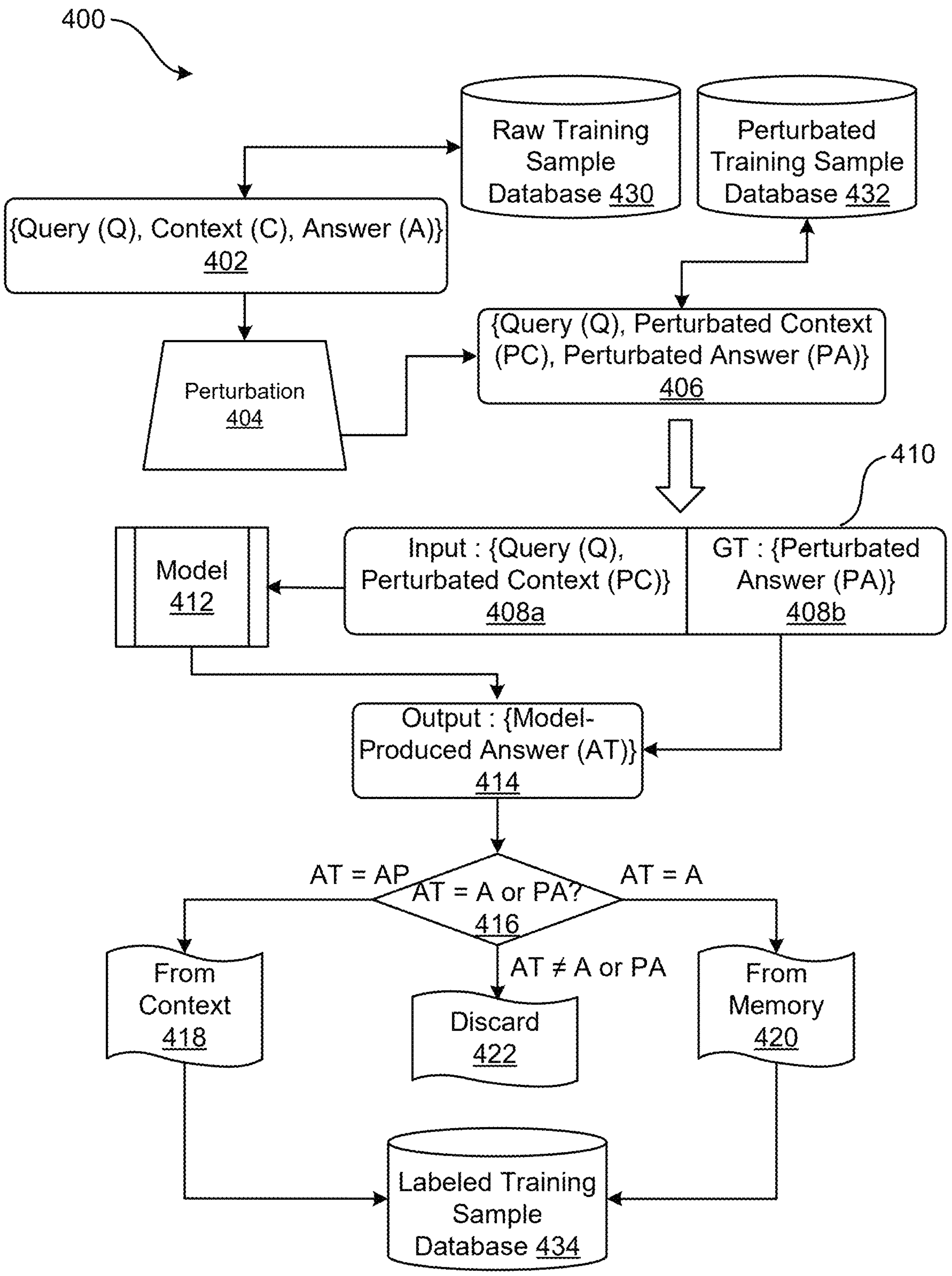
FIG. 4 shows an illustrative process to create, train, and test a corpus to check if the answers produced by the LLM are from memory or context, in accordance with one or more embodiments.

FIG. 4 shows an illustrative process to create, train, and test a corpus to check if the answers produced by the LLM are coming from memory or context, in accordance with one or more embodiments. Process 400 involves query processing, data perturbation, and model input for generating answers. For example, process 400 can include steps for creating controlled conflicts. Training samples including queries and contexts, as well answers in some cases, may be used to generate perturbed answers and contexts, which can be used to determine samples where a model uses context to generate an answer or model memory. For example, the experimental results obtained using process 400 of FIG. 4 can produce a corpora, such as described below in Table 3 and Table 4.

TABLE 3

| #Split | From Memory | From Context |
|---|---|---|
| Train | 4743 | 28317 |
| Test | 608 | 3400 |

Table 3 illustrates RR perturbated context on SQUAD datasets.

TABLE 4

| #Split | From Memory | From Context |
|---|---|---|
| Train | 8400 | 64450 |
| Test | 1198 | 8777 |
| Dev | 618 | 4920 |

Table 4 illustrates NRR perturbed context on NQ datasets.

Experiments

A. Dataset

For datasets, such as the SQUAD dataset (e.g., dev set), Natural Questions dataset (e.g., dev set), the MRQA dataset, and the relation extraction dataset, process 400 of FIG. 4 can include configuring system 100 to perform one or more of the following techniques:

(1) Replace the answer with a random word (R). In this example, the model would be expected to give a perturbated answer from the context.
(2) Replace the answer with a similar type of entity from the knowledge graph (KG). In this example, the model would be expected to give a perturbated answer from the context.
(3) Increase confidence in the entropy.
(4) Discuss the signal clarity for identifying the generation of text.

In some embodiments, process 400 may be performed using one or more components of system 100 of FIG. 1. For example, process 400 may leverage cloud components 110 to effectuate some or all of the described operations. Some embodiments include process 400 using one or more components of system 100 (e.g., cloud-based memory 112, cloud-based control circuitry 114, cloud-based I/O circuitry 116) to perform some or all of the operations of process 400.

Process 400 may begin at step 402. At step 402, a query-context-answer (QCA) triplet may be retrieved from raw training sample database 430. As mentioned above, raw training sample database 430 may be configured to store QCA triplets from a number of sources (e.g., SQUAD dataset, MRQA dataset, etc.). Although process 400 is illustrative as a single operation, persons of ordinary skill in the art will recognize that additional iterations of process 400 may be performed for additional QCA triplets retrieved from raw training sample database 430. Furthermore, while a single QCA triplet is depicted at step 402, multiple QCA triplets may be retrieved from raw training sample database 430. Process 400 may process each QCA triplet via its own iteration.

In some embodiments, raw training sample database 430 may include training prompts. These training prompts can include a training query and a training context. In this scenario, the training prompt can be input to a target model (e.g., model 412) to generate a training answer. The target model may correspond to an LLM. In some examples, access to token activations (e.g., a final transformer layer of the LLM) may be available to system 100 executing process 400. The QCA triplet can be formed upon generation of the training answer.

At step 404, a perturbation can be applied to the QCA triplet. The perturbation may, for example, be performed to the training answer (A) to obtain perturbated answer (PA). The perturbated answer can be used to generate a perturbated context (PC). For example, the perturbated context can include the same information as the original context (e.g., context (C)), however including at least one recitation of a ground truth answer replaced with the perturbated answer.

In some embodiments, the perturbation applied at step 404 may be a random perturbation or a controlled perturbation. For a random perturbation, a random word of the first answer inside the context can be replaced to create the perturbated context. The random perturbation technique forces the target model to fetch the perturbated string (e.g., representing the perturbated answer) from the perturbated context if the target model is using the perturbated context to generate the answer, as compared to model memory. Random perturbation can introduce randomness to the context to test whether the target model relies on its pre-trained knowledge or the provided context to generate responses. For a controlled perturbation, an entity of the first answer can be replaced with a random entity a same type. In some embodiments, the entity can be identified using a knowledge graph. Control perturbation makes the perturbation detection more challenging by ensuring the answer token is in the most plausible space, forcing the model to pick up the same token as the answer if it used the context. In some embodiments, the knowledge graph can be built on an open-source collection of data items, private data, or a combination thereof. For example, some knowledge graphs may be constructed by extracting (subject, predicate, object) triplets from training data from quality assurance (QA) models. These (subject, predicate, object) triplets can be generated by identifying named entities (Nes) (e.g., subjects and objects) and their relationships (e.g., predicates) using dependency parsing and named entity recognition (NER). The knowledge graph created using these techniques can include learned factual relationships determined by the model during training. These learned factual relations can be used to simulate knowledge conflicts by replacing entities in test questions to assess whether the model relies on parametric knowledge or contextual evidence.

As an illustrative example, an example query-context-answer (QCA) triplet (e.g., where the answer refers to the ground truth) may include:

Query (Q): "Why did Ray Eberle die?"
Context (C): "Ray Eberle died of a heart attack in Douglasville, Georgia on
Aug. 25, 1970, aged 60.
Answer (A): "Heart attack."

If the perturbation applied at step 404 corresponds to a random perturbation, one or more words from the answer (A) (e.g., "heart attack") can be replaced with one or more random words. This forms a perturbated answer (PA). For example, the words "heart attack" can be replaced with "umbrella jousting." In this example, "umbrella jousting" would represent a perturbated answer (PA), with the ground truth answer (A) being "heart attack." Thus, the perturbated context (PC) should include at least one recitation of the perturbated answer (PA). As an example, the perturbated context and perturbated answer may include:

Perturbated Context (PC): "Ray Eberle died of a umbrella jousting in
Douglasville, Georgia on Aug. 25, 1970, aged 60.
Perturbated Answer (A): "Umbrella jousting."

If the perturbation applied at step 404 corresponds to a controlled perturbation, one or more entities represented by the answer (A) (e.g., "heart attack") may be replaced with one or more related entities. This forms the perturbated answer (PA). For example, the answer "heart attack" can correspond to a medical condition. Thus, the perturbation applied at step 404, for a controlled perturbation, can replace the answer (A) (e.g., "heart attack") with another answer having the same or similar medical condition entity. For example, for the perturbation applied at step 404 being a controlled perturbation, the perturbated answer may be "pneumonia," another medical condition. In some embodiments, controlled perturbations can use a knowledge graph to identify which entities are related to the entity or entities represented by the answer (A).

As an example, the perturbated context may include:

Perturbated Context (PC): "Ray Eberle died of a pneumonia in Douglasville,
Georgia on Aug. 25, 1970, aged 60.
Perturbated Answer (A): "Pneumonia."

Advantageously, by creating perturbated answers (PA), perturbated contexts can automatically be formed. For example, where the perturbation corresponds to a random perturbation (e.g., "heart attack" becomes "umbrella jousting"), the original context (C) can be modified such that it includes at least one recitation of the perturbated answer. Therefore, the computational resources required to generate the perturbated contexts is greatly reduced. For example, the computational resources to generate the perturbated context is the same or similar to the computational resources used to generate the perturbated answers.

In some embodiments, upon generation of the perturbated answer and the perturbated context, a perturbated QCA triplet can be generated at step 406. For example, a data structure can be populated to include query, context, answer (e.g., a QCA triplet), and a query, perturbated context, perturbated answer (e.g., a perturbated QCA triplet). The perturbated QCA triplet can be stored in perturbated training sample database 432. In some examples, the perturbated QCA triplet may be stored with a QCA triplet identifier of a corresponding QCA triplet used to create the perturbated QCA triplet.

At step 410, an input prompt 408*a* and ground truth 408*b* can be formed to determine whether model 412 leverages perturbated context (PC) to generate an answer. In some embodiments, input prompt 408*a* can be formed from a perturbated QCA triplet stored in perturbated training sample database 432, as mentioned above. For example, the perturbated QCA triplet formed at step 406, including query (Q), perturbated context (PC), and perturbated answer (PA), can be used to form input prompt 408*a* and ground truth 408*b*. In the example, input prompt 408*a* can be provided to model 412. In some examples, model 412 refers to an LLM.

At step 414, an output from model 412 can be obtained. The output can include a model-produced answer (AT). Model-produced answer (AT) can also be referred to herein interchangeably as the predicted answer (AT). The model-produced answer (AT) can then be compared to ground truth 408*b* at step 416.

If, at step 416, the model-produced answer (AT) is determined to match the perturbated answer (PA) (e.g., from ground truth 408*b*), then this indicates that model 412 leveraged perturbated context (PC) to when generating the model-produced answer (AT). For example, if model 412 leverages perturbated context (PC) to generate model-produced answer (AT), then model-produced answer (AT) should align with perturbated context (PC). If, at step 416, model-produced answer (AT) is determined to align with perturbated context (PC), a first label can be assigned to the QCA triplet, the perturbated QCA triplet, the model-produced answer, other data, and/or a data structure including some or all of the aforementioned data. In some embodiments, model-produced answer (AT) aligns with perturbated context if an alignment score generated using model-produced answer (AT) and perturbated context (PC) (along with perturbated answer (PA)) satisfies an alignment score threshold condition. For example, the alignment score threshold condition can be satisfied if an alignment score generated based on model-produced answer (AT) and perturbated context (PC) is greater than or equal to a threshold alignment score, and not on other sources, such as model memory. For example, at step 418, a first label can be assigned to perturbated QCA triplet (and the data structure) to indicate that model 412 leveraged perturbated context (PC) to generate predicted answer (AT).

If, at step 416, the model-produced answer (AT) is determined not match the perturbated answer (PA) (e.g., from ground truth 408*b*), and instead matches the original answer (A), then this indicates that model 412 did not leverage perturbated context (PC) to create model-produced answer (AT) and instead used model memory. For example, at step 420, a second label can be assigned to the QCA triplet, the perturbated QCA triplet, the model-produced answer, other data, and/or a data structure including some or all of the aforementioned data.

If the model-produced answer (AT) does not match the perturbated answer (PA) or the original answer (A), then this can indicate that model 412 did not leverage the context nor did it leverage its model memory and instead used another source. In this example, process 400 may proceed to step 422, where the QCA triplet, the perturbated QCA triplet, the model-produced answer, other data, and/or a data structure including some or all of the aforementioned data, may be discarded. The labeled samples (e.g., the QCA triplet, the perturbated QCA triplet, the model-produced answer, other data, and/or a data structure including some or all of the aforementioned data, including labels indicating whether a target model used the provided context to generate the answer) can be provided to labeled training sample database 434 for storage. In some examples, the labeled samples may also include the corresponding token activations extracted from a last layer of model 412.

In some embodiments, an alignment score can be computed. The alignment score can represent a semantic equivalence of a given answer to the expected answer supported by the provided context. In some examples, the alignment score measures how close the model-produced answer (AT) is to the expected answer. By leveraging controlled conflicts, the expected answer can be tuned to be the perturbated answer (PA). Thus, some examples of determining the alignment of model-produced answer (AT) and perturbated context (PC) include determining a similarity between model-produced answer (AT) and perturbated answer (PA). Therefore, when determining the alignment score, a similarity between model-produced answer (AT) and perturbated answer (PA) can be compared to one or more threshold similarity scores.

As an illustrative example, to determine whether model-produced answer (AT) aligns with perturbated context (PC), a first embedding representing the model-produced answer (AT) and a second embedding representing perturbated answer (PA) can be generated. A similarity metric can be computed using the first embedding and the second embedding to determine how semantically similar model-produced answer (AT) is to perturbated answer (PA).

The threshold similarity scores can be selected such that noise is reduced in the labeling process. For example, the score, S, may be a function of model-produced answer (AT), the original (non-perturbated) answer (A), and perturbated answer (PA). Therefore, the decision at step 416 can be determined using Equation 1:

$$\text{Label} = \{L_{Context} = \{AT \mid S(AT, A) < T_1, \text{ where } S(AT, PA) > T_1'\} L_{Memory} = \{AT \mid S(AT, A) > T_2, \text{ where } S(AT, PA) < T_2'\}. \quad \text{Equation 1}$$

In Equation 1, $L_{context}$ represents a context label assigned to model-produced answer (AT). In some embodiments, the context label can be applied to a data structure including the QCA triplet, the perturbated QCA triplet, and/or a query (Q)-perturbated context (PC)-model-produced answer (AT) triplet. $L_{Memory}$ represents a memory label assigned to model-produced answer (AT). In some embodiments, the memory label can be applied to a data structure including the QCA triplet, the perturbated QCA triplet, and/or a query (Q)-perturbated context (PC)-model-produced answer (AT) triplet.

Experiment Results

Example results are depicted in Table 5. For example, Table 5 may display the results for test datasets created using knowledge base perturbations.

TABLE 5

| Data | Mtd | Acc | P | R | FNR | F1 |
|---|---|---|---|---|---|---|
| TrQA (D) | BL | 0.70 | 0.70 | 1.00 | 0.00 | 0.82 |
| | En | 0.66 | 0.70 | 0.88 | 0.12 | 0.78 |
| | Ve2 | 0.75 | 0.78 | 0.90 | 0.10 | 0.83 |
| | 140 | 0.96 | 0.97 | 0.98 | 0.02 | 0.97 |
| SQD.(D) | BL | 0.82 | 0.82 | 1.00 | 0.00 | 0.90 |
| | En | 0.81 | 0.83 | 0.96 | 0.04 | 0.89 |
| | Ve2 | 0.81 | 0.85 | 0.92 | 0.08 | 0.89 |
| | 140 | 0.94 | 0.96 | 0.97 | 0.03 | 0.97 |
| BASQ(T) | BL | 0.58 | 0.58 | 1.00 | 0.00 | 0.74 |
| | En | 0.56 | 0.57 | 0.93 | 0.07 | 0.71 |
| | Ve2 | 0.67 | 0.68 | 0.84 | 0.16 | 0.75 |
| | 140 | 0.94 | 0.95 | 0.94 | 0.06 | 0.95 |
| Re_Ext.(T) | BL | 0.85 | 0.85 | 1.00 | 0.00 | 0.92 |
| | En | 0.83 | 0.86 | 0.95 | 0.05 | 0.91 |
| | Ve2 | 0.82 | 0.92 | 0.87 | 0.13 | 0.89 |
| | 140 | 0.96 | 0.98 | 0.97 | 0.03 | 0.98 |

Example results are also depicted in Table 6. For example, Table 6 may display the results from random perturbations.

TABLE 6

| Data | Mtd | Acc | P | R | FNR | F1 |
|---|---|---|---|---|---|---|
| TrQA (D) | BL | 0.51 | 0.51 | 1.00 | 0.00 | 0.68 |
| | En | 0.50 | 0.51 | 0.91 | 0.09 | 0.65 |
| | Ve2 | 0.66 | 0.62 | 0.90 | 0.10 | 0.73 |
| | 140 | 0.96 | 0.93 | 0.99 | 0.01 | 0.96 |
| SQD.(D) | BL | 0.66 | 0.66 | 1.00 | 0.00 | 0.79 |
| | En | 0.63 | 0.66 | 0.90 | 0.10 | 0.76 |
| | Ve2 | 0.70 | 0.72 | 0.90 | 0.10 | 0.80 |
| | 140 | 0.92 | 0.90 | 0.99 | 0.01 | 0.94 |
| BASQ(T) | BL | 0.48 | 0.48 | 1.00 | 0.00 | 0.65 |
| | En | 0.46 | 0.47 | 0.91 | 0.09 | 0.62 |
| | Ve2 | 0.63 | 0.59 | 0.78 | 0.22 | 0.67 |
| | 140 | 0.96 | 0.92 | 0.99 | 0.01 | 0.96 |
| Re_Ext.(T) | BL | 0.58 | 0.58 | 1.00 | 0.00 | 0.73 |
| | En | 0.57 | 0.58 | 0.96 | 0.05 | 0.72 |
| | Ve2 | 0.74 | 0.77 | 0.79 | 0.21 | 0.78 |
| | 140 | 0.94 | 0.91 | 0.99 | 0.01 | 0.95 |

Table 7 below illustrates results from different extractors on test datasets created using knowledge base perturbations, under backbox settings.

TABLE 7

| Ext. | Method | Acc | P | R | FNR | F1 |
|---|---|---|---|---|---|---|
| BioASQ | L13.1-8b | 0.94 | 0.95 | 0.94 | 0.06 | 0.95 |
| | L13.2-3b | 0.92 | 0.90 | 0.96 | 0.04 | 0.93 |
| | Mis-7b | 0.92 | 0.92 | 0.94 | 0.06 | 0.93 |
| Rel. Ext. | L13.1-8b | 0.96 | 0.98 | 0.97 | 0.03 | 0.98 |
| | L13.2-3b | 0.95 | 0.98 | 0.95 | 0.05 | 0.97 |
| | Mis-7b | 0.94 | 0.99 | 0.94 | 0.06 | 0.96 |

Figure 5:
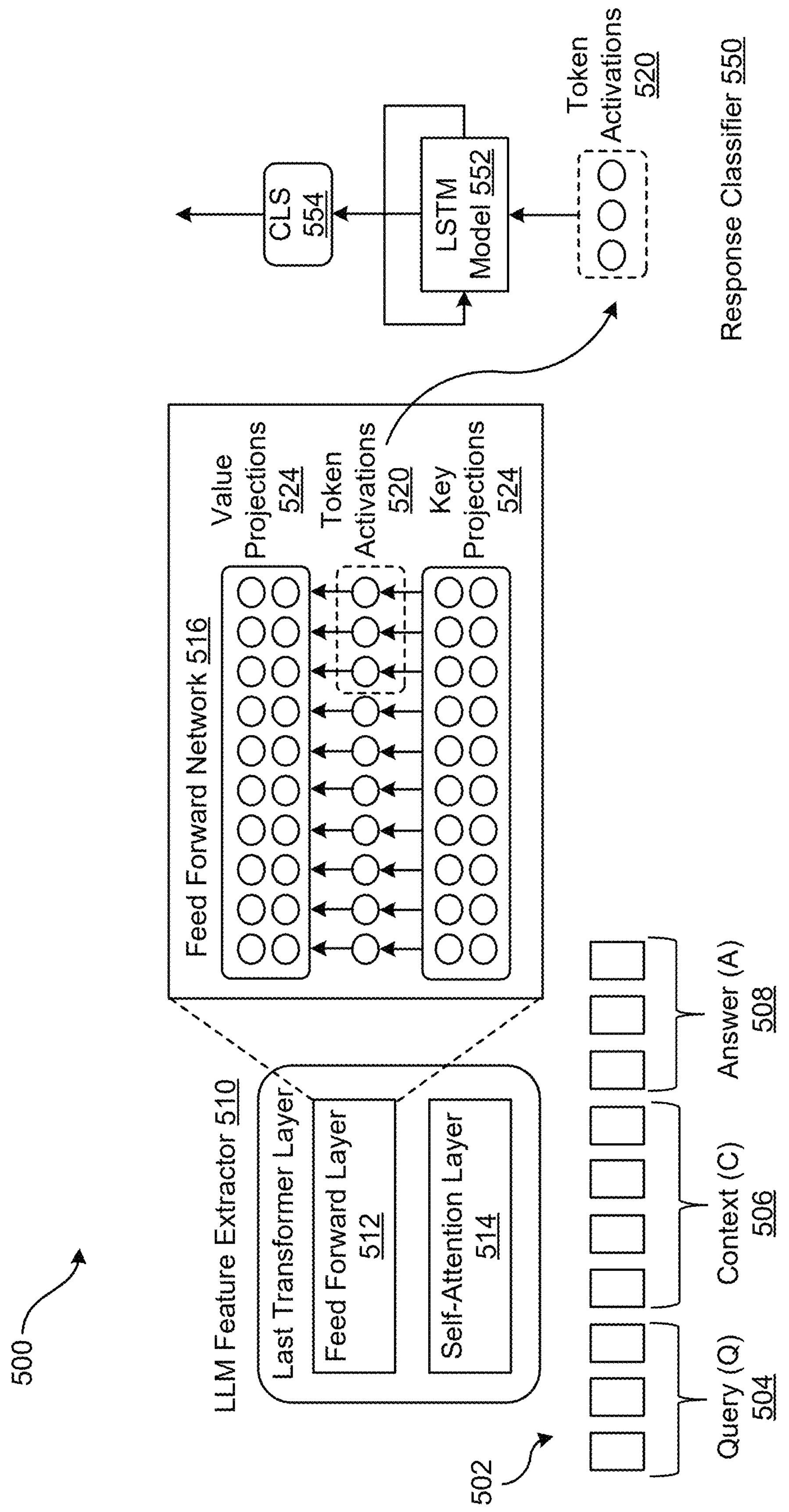
FIG. 5 shows an illustrative diagram of an example model used to capture patterns of activation across a Feed forward Network (FFN) to capture whether the output is from memory or context, in accordance with one or more embodiments.

FIG. 5 shows an illustrative diagram of an example model 500 used to capture patterns of activation across FFN to capture whether the output is from memory or context, in accordance with one or more embodiments. As seen in FIG. 5, model 500 includes an LLM feature extractor including a feed forward layer and a self-attention layer. Also included in FIG. 5 is a response classifier, as described above. In some embodiments, model 102 of FIG. 1 can be implemented using model 500, or portions of model 500.

Model 500 may include an AI model 510 and a classification model 550. For example, AI model 510 may be implemented as an LLM feature extractor including a feed forward layer 512 and a self-attention layer 514. In some embodiments, a QCA triplet 502 may be input to AI model 510. QCA triplet 502 may include a query 504, a context 506, and an answer 508 (e.g., the response). In some embodiments, AI model 510 may include one or more transformer layers (e.g., hidden layers). One or more of these transformer layers can include feed forward layer 512 and self-attention layer 514. In an example, feed forward layer 512 and self-attention layer 514 may form a last transformer layer of AI model 510 (e.g., an LLM feature extractor).

AI model 510 in some examples may be an LLM feature extractor. LLM feature extractors operate by transforming input tokens into high-dimensional representations, often referred to as token activations, through successive layers of computation. In the final transformer layer, self-attention layer 514 acts as a self-attention mechanism and feed forward layer 512 acts as a feedforward neural network. Input token embeddings from the previous layer of the LLM feature extractors can be passed through self-attention layer 514. Each token attends to every other token in the sequence (e.g., QCA triplet) using learned attention weights. This allows the LLM feature extractor (e.g., AI model 510) to contextualize each token (e.g., three (3) tokens representing query 504, four (4) tokens representing context 506, three (3) tokens representing answer 508) based on its relationship to others. This results in a set of updated token representations that capture long-range dependencies and syntactic or semantic relationships. These representations can then be passed through feed forward layer 512. Feed forward layer 512, as illustrated by model 500, can include two linear transformations separated by a non-linear activation function (such as GELU or ReLU). Feed forward layer 512 can refine the information output from self-attention layer 514 (e.g., the set of updated token representations representing long-range dependencies and syntactic or semantic relationships) by projecting the tokens into a different space emphasizing patterns useful for downstream tasks. Residual connections and layer normalization are applied around each subcomponent to stabilize learning and preserve information. The final output of this transformer layer-token activations 520—can encode rich, contextualized features for each input token. Token activations 520 can be extracted and used as embeddings for tasks such as classifications. For example, token activations 520 can be provided, as input, to classification model 550. Model 550 can be trained to predict whether token activations 520, which represent answer 508, indicate that AI model 510 used context 506 to respond to query 504 or if AI model 510 used model memory (or another source different from context 506) to generate answer 508.

Feed forward layer 512 can include a feed forward network 516. Feed forward network 516 can operate by processing input data through a series of layers to generate an output. For example, feed forward network 516 can include a key projection layer 522 and value projection layer 524. The input data, often in the form of token activations, can be passed through key projection layer 522, which can transform the input tokens into a set of key vectors. These key vectors can then be used to determine the relevance of each token. The input data can also be passed through value projection layer 524, which can transform the input tokens into a set of value vectors. Token activations 520 can correspond to the projection of the keys to the values, meaning that the key vectors can be used to weigh the value vectors, capturing the relationships and dependencies between the tokens. The resulting weighted value vectors can then be passed through a series of non-linear activation functions and linear transformations to produce the final output of feed forward layer 512. This can allow feed forward network 516 to capture complex patterns and dependencies in the input data.

Classification model 550 can include an LSTM model 552 and a classifier 554. Classification model 550 can take, as input, token activations 520 and determine, based on token activations 520, whether answer 508 was generated by AI model 510 using context 506 or model memory. LSTM model 552 may be configured to process sequential data through a series of gates and memory cells to capture long-term dependencies and patterns. In the illustrative example, token activations 520 represent the sequential data. LSTM model 552 can be implemented using an architecture including three main gates: a forget gate, an input gate, and an output gate. The forget gate can determine which information from the previous cell state should be discarded, while the input gate can decide what new information should be added to the current cell state. The output gate controls what information from the current cell state should be passed to the next hidden state. This gating mechanism allows LSTM model 552 to selectively remember and forget information, enabling it to maintain and update a long-term memory state over time. By doing so, LSTM model 552 can effectively handle the vanishing gradient problem that traditional recurrent neural networks (RNNs) face, making it well-suited for tasks involving long sequences of data. The output of LSTM model 552 can then be passed through a classifier 554. Classifier 554, for example, can include a fully connected layer and a SoftMax layer that generates the final prediction. LSTM model 552 can be configured to capture complex patterns in token activations 520. This can allow classification model 550 to learn how token activations behave when AI model 510 uses context 506 as compared to when AI model 510 uses model memory.

The process performed by model 500 can be described, in some embodiments, based on an input prompt x. Input prompt x includes a query and a context. In particular, the query and context can represent an instruction for a model of what to do, a question to be answered by the model, and supporting information to be used by the model to answer the question. The output token probability can be represented as P(y*), which is a function of input prompt x and model parameters θ, as illustrated by Equation 2:

$$P(y^*) = P(y^* \mid x, \theta). \qquad \text{Equation 2}$$

For transformer models, such as LLMs, the token generation process can include prompt x being encoded into a memory pattern. This memory pattern can be represented by its token activations. For example, if a denotes the final transformer layer's token activations, as illustrated by AI model 510, corresponding to the token immediately preceding y*, the output probability can be expressed as the conditional probability over a, as illustrated in Equation 3:

$$P(y^*) = \int P(y^* \mid a) P(a \mid x, \theta) da. \qquad \text{Equation 3}$$

In Equation 3, P(a|x, θ) represents the memory pattern induced by input prompt x. Knowledge neurons, for example, have in some experiments shown that the most factual-related neurons are in fact distributed at the topmost layer of transformer models. Different expressions referring to the same knowledge tend to trigger similar activation patterns. Therefore, a can be considered to be the activations from the last transformer layer (e.g., final transformer layer of AI model 510). For y* being conditionally independent of x, θ, given a, the output probability can simplify to:

$$P(y^*) = P(y^* \mid a^*). \qquad \text{Equation 4}$$

In Equation 4, a* can be set to equal $f(x, \theta)$. Here, a* can represent the mapping of input prompt x to its corresponding memory pattern, condition on model parameters θ.

LLMs can generate output tokens in an autoregressive manner and, therefore, can utilize the sequence of answer token activations as temporal memory signals to train classification model 550. For example, the LLM's (e.g., AI model 510) response can be assigned a first label (e.g., "0") if model-produced answer (AT) is generated based on memory, while a second label (e.g., "1") can be assigned to model-produced answer (AT) if generated based on context. These labels are, for example, exemplary.

In some embodiments, the answer token activations a* can be extracted from the final transformer layer. These activations can be passed to LSTM model 552, with a classification head (e.g., classifier 554) to predict a source label, as illustrated by Equation 5:

$$P(1(y^*) = 1 \mid a^*, \emptyset). \qquad \text{Equation 5}$$

In Equation 5, Ø can represent the parameters of classifier 554.

Figure 6A:
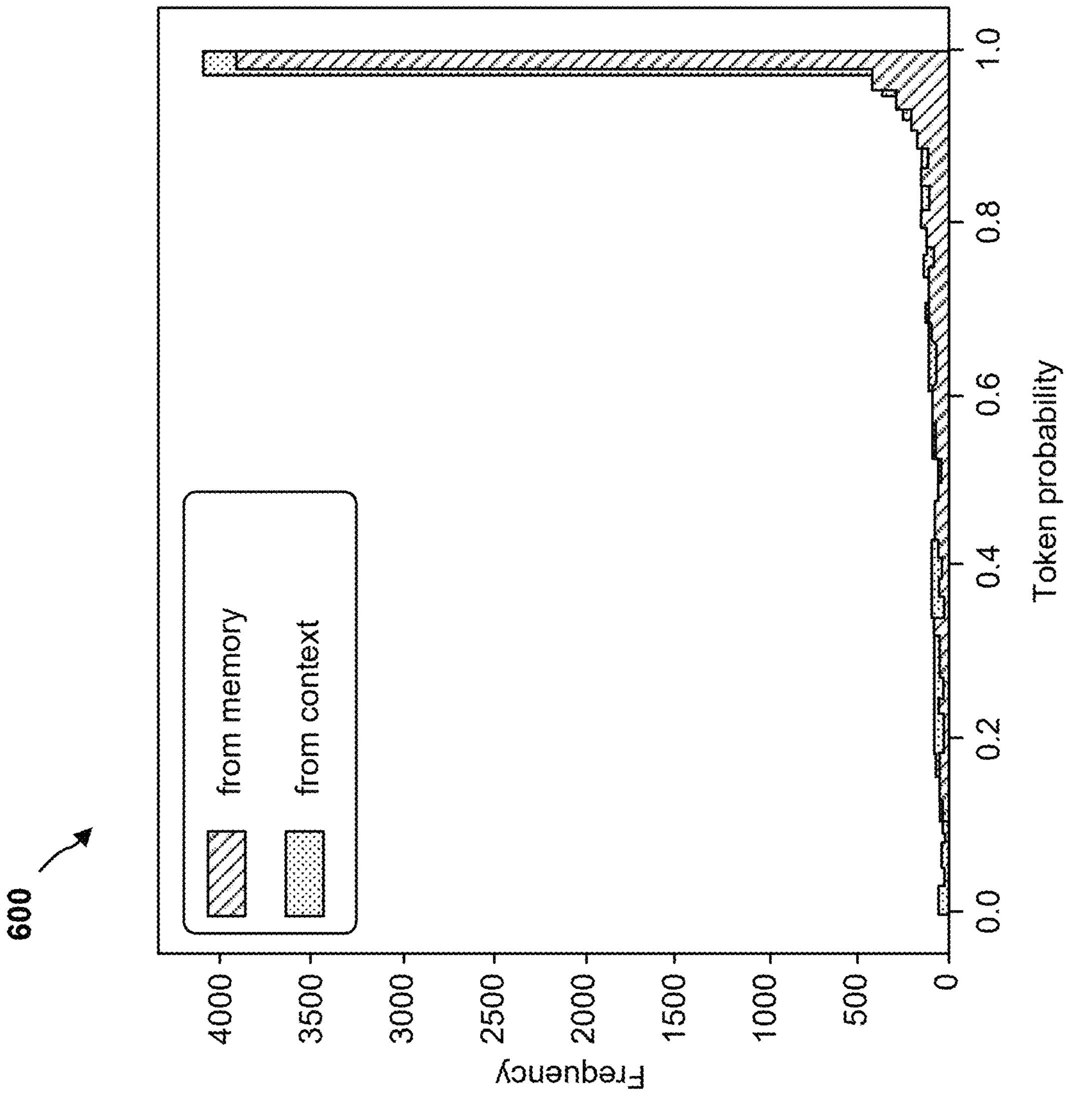
FIGS. 6A-6B show illustrative diagrams of a token probability and an answer entropy distribution for a standardization framework, in accordance with one or more embodiments.
Figure 6B:
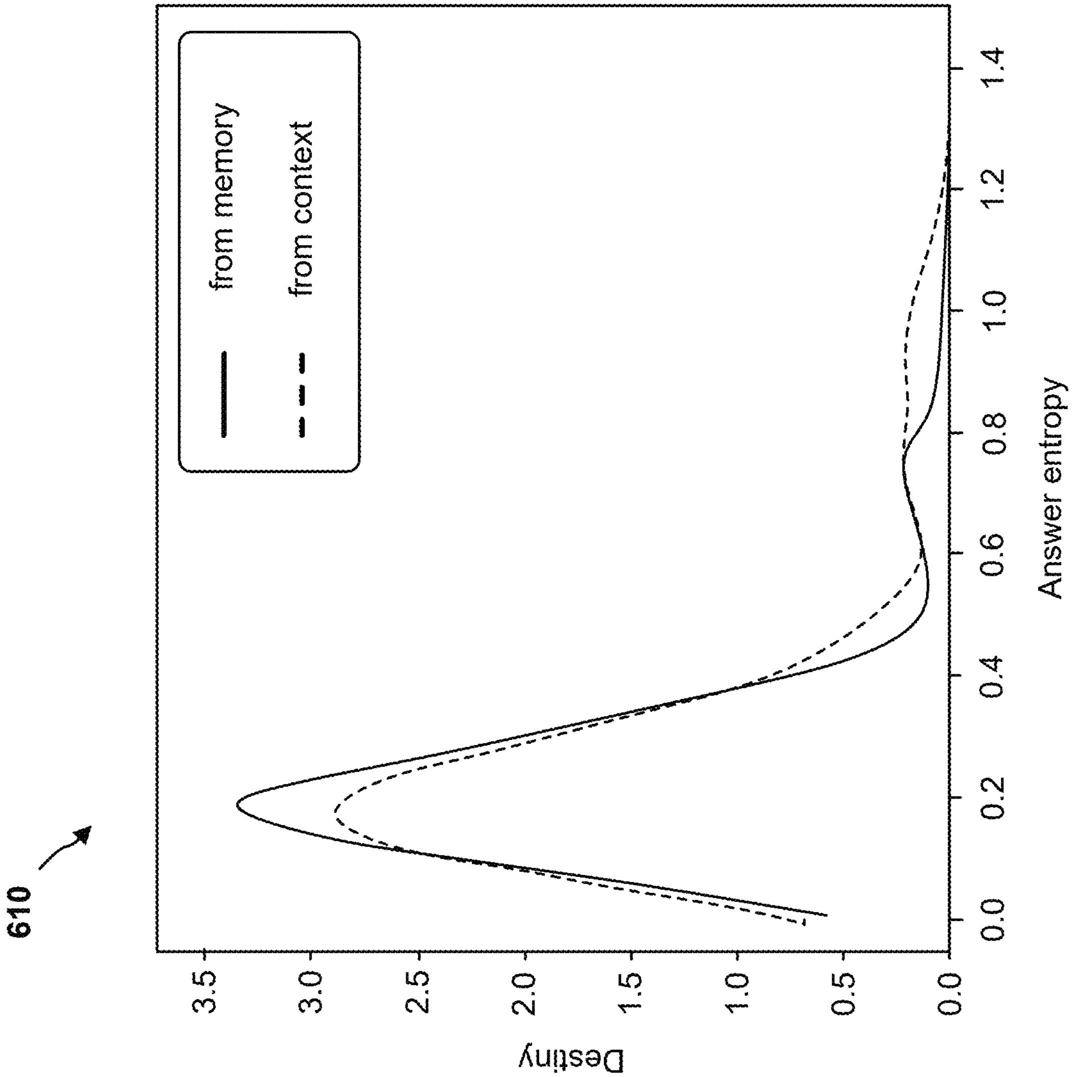
Figure 7A:
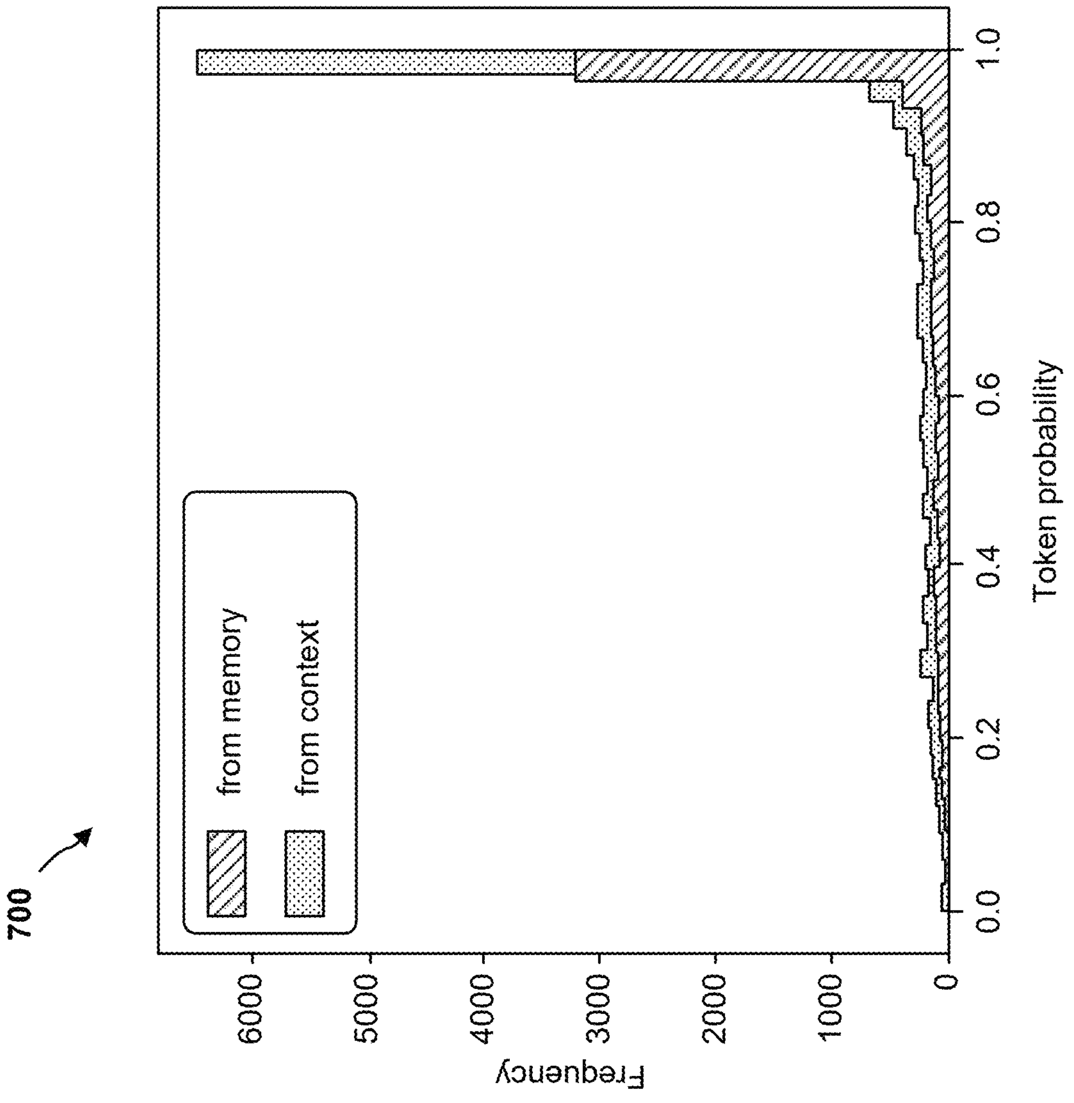
FIGS. 7A-7B show illustrative diagrams of a token probability and an answer entropy distribution for an NLP task for information extract, in accordance with one or more embodiments.
Figure 7B:
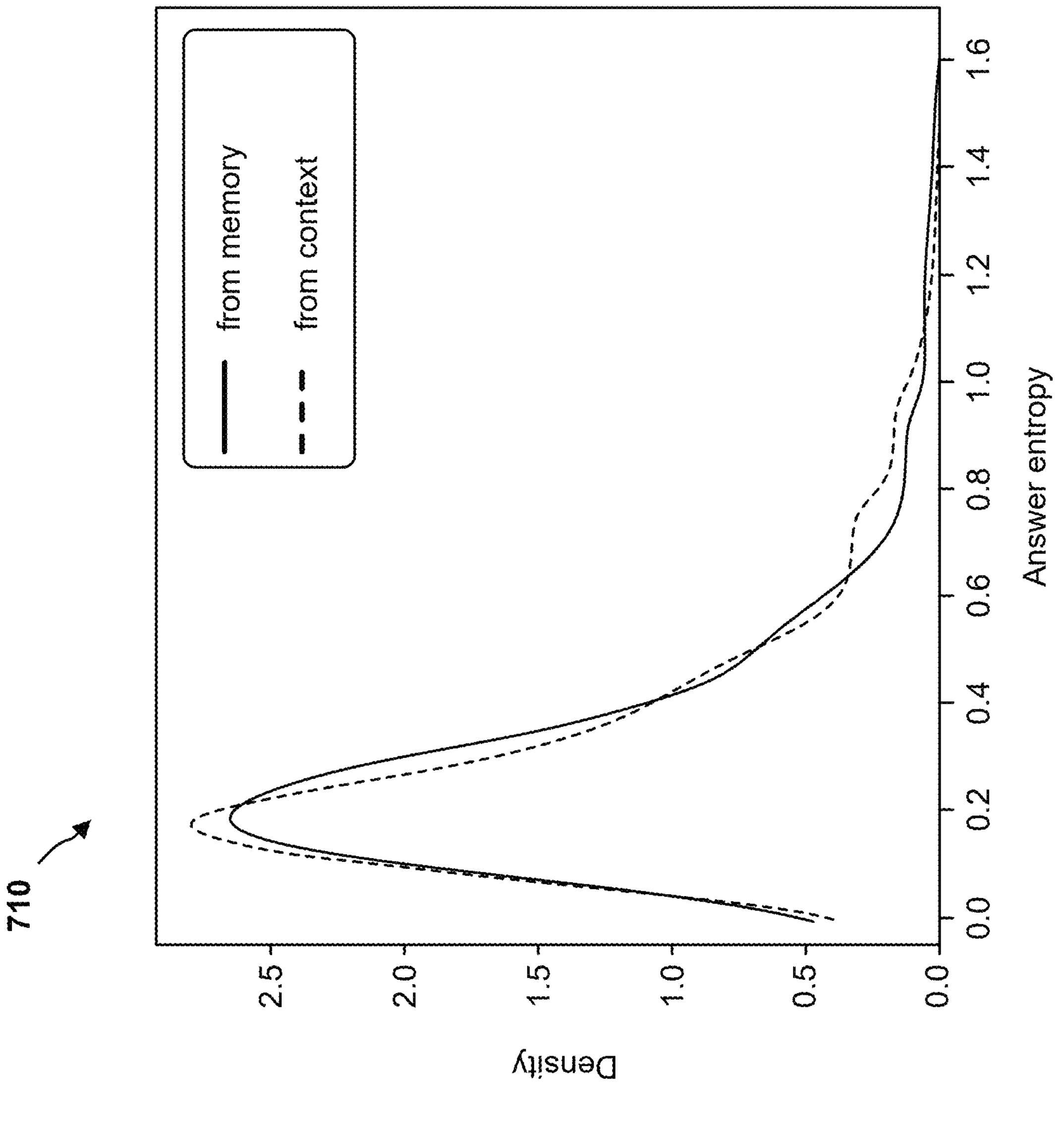

FIGS. 6A-6B respectively show an illustrative diagram 600 describing a token probability and an illustrative diagram 610 describing an answer entropy distribution for a standardization framework, respectively, in accordance with one or more embodiments. FIGS. 7A-7B respectively show an illustrative diagram 700 of a token probability for an NLP task for information extract and an illustrative diagram 710 of an answer entropy distribution for an NLP task for information extract, in accordance with one or more embodiments. In token probability diagrams 600 and 700 of FIGS. 6A and 7A and answer entropy diagrams 610 and 710 of FIGS. 6B and 7B, results (in blue) refer to memory results while results in orange refer to those from context. In particular, the examples of FIGS. 6A-6B relate to the BioASQ biomedical question-answering challenge. The examples of FIGS. 7A-7B relate to the RelationExtraction NLP task.

Described herein are systems, methods, and programming for determining a context source of an LLM output. In the technical field of machine learning, and particularly in the field of LLMs, technical problems exist including incorrect or inconsistent response generation. This technical problem can be formalized as a conflict between pre-trained memory of an LLM and external context provided during inference. To address this technical problem, as well as others, the technical solutions described herein include simulating a RAG model with controlled perturbations in context to deliberately contradict the model's pretrained knowledge. Thus, a technical effect of examining the LLM's response—to determine whether it adheres to its pre-trained memory or follows the provided context—is the creation of a framework to classify the source of the generated answer.

The technical solution includes extracting activations of an answer token from a final layer of an LLM and using the extracted activations as input features for an LSTM-based classifier. This LSTM-based classifier can be used to determine whether the response is derived from the LLM's pre-trained memory or the given context. The activation sequence of the answer tokens can encode crucial signals related to the model reasoning process. Some example experimental results on multiple data sets indicated high (e.g., 97%) accuracy at identifying the source of the generated response.

Usage of an LLM in Retrieval Augmented Generation (RAG) settings involves taking an input prompt and generating a response. This response is motivated by the components of the prompt: Instruction (I), Question (Q), and Context (C). While generating response (R), the LLM can tap into its memory, pay attention to the input context, and generates one token at a time as a response.

As LLMs get more complex, such as those having large quantities (e.g., billions, trillions, etc.) of parameters, they tend to capture complex relationships between the various input strings they have seen and learn emergent behaviors. For example, when trained on large quantities (e.g., billions, trillions, etc.) of tokens, it can be unclear during inference time which parts of their memory the LLM is addressing. Research appears to suggest that memory neurons may be present in the activations. Therefore, knowing the patterns of activations can help learn the behavior of LLMs.

The technical solutions described herein capture these complex relationships as a train of auto-regressive signals coming through the different layers of the LLM sequentially and treat the signals as a temporal chain of activations. If the answer tokens are retrieved only from memory, ignoring the context provided, the LLM can detect this event by learning patterns in the activations of neurons across multiple layers while generating the answer tokens.

In some embodiments, these activations may be passed through an LSTM model to learn the long-term dependencies and the patterns inside these activations. The output of the LSTM model may be passed to a fully connected layer and then through a SoftMax layer to classify whether the input is coming from memory or context. By doing so, the LLM can capture the activations as a chain of activations using an LSTM model. Furthermore, this can allow for a process to be developed to create data to capture whether an output is from memory or context, including a methodology for creating training data of such a type.

As an illustrative example, to create data, for a given Question (Q), Context (C), and Answer (A) from a corpus (e.g., a publicly available corpus), synthetic training data may be created to train the LLM to capture whether the answer is generated from memory or context. To create the training data, one or more strategies may be used. For example, one strategy refers to a random perturbation of answer tokens in the context. In this example, the answer token can be replaced in the context with a random word. Another strategy refers to a near relevant perturbation of answer tokens in the context. In this example, the closest token which shares the same named entity (NE) can be identified and replaced with the nearest answer by mining a knowledge graph built using a knowledge base (e.g., Wikipedia). For both strategies, if the LLM was paying attention to the context, then the answer output by the LLM should be a perturbed token. Thus, a tool to identify if answers are coming from "context" or "memory" is crucial to building trust-worthy RAG systems. Additionally, these solutions allow the activations of just the answer tokens across the MLP layers to be captured as well as patterns of deviation when tokens are not grounded inside the context to be learned.

In some embodiments, the technical solutions described herein can be used for determining whether an artificial intelligence model generated an answer, responding to an input prompt including a query and a context, using the context or model memory. This technical solution can address problems with artificial intelligence models that generate answers using model memory instead of context, which can lead to possible security concerns, incorrect answers, and decreased trustworthiness with the model. Additionally, the described technical solutions address issues with existing hallucination evaluation techniques, which overlook the internal workings of the target model. This can lead to problems when the model generates the answer only from memory and has not paid attention to the provided context.

Some embodiments implement technical solutions for artificial intelligence models (e.g., LLMs) that have accessible token activations. A model with accessible token activations refers to an artificial intelligence model for the token activations associated with the model's generation of an answer, in response to an input prompt, can be extracted. In some examples, the input prompt, which may be received from a client device, may include a query and a context. The query includes a question or instruction that directs the artificial intelligence model (e.g., an LLM) to extract or generate information based on any accompanying context. The context includes background information or supporting information (e.g., text, documents, videos, etc.) to help the artificial intelligence model (e.g., an LLM) interpret and respond to the query. The input prompt can be provided to the artificial intelligence model, which can be used to generate an answer to the query. As mentioned above, because some example artificial intelligence models have output layers that are accessible, these token activations associated with the artificial intelligence model generating the answer can be extracted.

In some embodiments, the token activations can be input to a classification model. The classification model can be trained to determine, for a given set of token activations, a label. The label can indicate whether an artificial intelligence model that produced the set of token activations (which may be the same model that generated the answer in response to the input prompt or may be a different model) used the provided context or model memory to generate the answer. A flag can be generated and assigned to the answer based on the label. For example, if the label indicates that the answer was generated by the artificial intelligence model using the provided context, then the flag may indicate that the answer was produced using the provided context. By providing notifications of an answer's compliance with the provided context or deviation from the provided context, confidence in the responses produced by the artificial intelligence model can be enhanced. In some examples, a graphical user interface can be rendered on the client device to display the response to the input prompt including the answer and the flag.

Some embodiments implement the technical solutions for artificial intelligence models (e.g., LLMs) that do not have accessible token activations. In other words, an input prompt including a query and a context may be input to a first model, which can generate an answer. However, the first model may not offer public access to token activations (or other information regarding the inner workings of the model). Therefore, the previously mentioned techniques would not be able to be used to determine whether the generated answer is rooted in the provided context or the model's memory.

In such examples where the token activation values associated with the generation of the answer by these artificial intelligence models is not available for training the classification model, the technical solutions described herein can include leveraging a token activation-accessible artificial intelligence model to obtain the token activations. The token activation-accessible artificial intelligence model can provide access to its transfer layers to enable extraction of token activations used when generating answers to input prompts. To simulate the process performed by the token activation inaccessible artificial intelligence model, the query, context, and answer can be input to the token activation-accessible artificial intelligence model, from which the token activations used to generate the answer based in the input query and context, to obtain/extract the token activations.

In some examples, a request may be received from a client device. The request can be to determine whether an answer produced by one artificial intelligence model (e.g., the artificial intelligence model that does not have accessible token activations) responding to an input prompt including a query and a context, was generated using the provided context or model memory. The request may include the query-context-answer (QCA) triplet. The QCA triplet may be input to the token activation-accessible artificial intelligence model. For example, the input prompt including the query and the context along with the answer generated by the artificial intelligence model for which token activations are not accessible in response to the input prompt, can be provided, as input, to the token activation-accessible artificial intelligence model. As an output layer of the token activation-accessible artificial intelligence model can be accessed, a set of token activations associated with the token activation-accessible artificial intelligence model generating the answer can be extracted. The set of token activation can be input to a trained classification model to obtain a label indicating whether the artificial intelligence model for which token activations are not accessible generated the answer using the context or its model memory. A flag can be generated and assigned to the answer based on the label. For example, if the label indicates that the answer was generated by the artificial intelligence model using the provided context, then the flag may indicate that the answer was produced using the provided context. This allows for a recipient of the response to have confidence that the artificial intelligence model for which token activations are not accessible (i) accurately responded to the input prompt and (ii) correctly leveraged the provided context to generate the answer. In some examples, a graphical user interface can be rendered on the client device to display the response to the input prompt including the answer and the flag.

Some embodiments include the technical solutions for generating training data that can be used to train a classification model and training the classification model using the training data. The classification model, as mentioned above, can be used to determine whether a given artificial intelligence model (with which token activations are accessible or not accessible) generated an answer using context provided in an input prompt or model memory (e.g., from model training). One technical challenge in developing such a classification model is (i) determining how such a classification model can be trained and (ii) creating the training data for training the classification model. To address this challenge, controlled conflicts are created and used to form training data. In some examples training data for training a classification model (e.g., a large language model classification model) can be generated. The classification model, as mentioned above, may be configured to determine a source of an answer generated by an artificial intelligence model, such as a large language model. The training data can include, for example, a plurality of sample sets of token activations and a plurality of reference labels corresponding to the sample sets of token activations. Moreover, each sample set of token activations may be associated with a corresponding answer generated by the artificial intelligence model responding to a sample prompt input to the artificial intelligence model. The reference labels respectively indicate whether the corresponding answer generated by the artificial intelligence model corresponds to the corresponding context of the sample prompt or model memory of the artificial intelligence model.

In some embodiments, generating the training data includes, for each sample prompt, inputting the query and the context of the sample prompt into the artificial intelligence model to obtain a first answer. A perturbated first answer may be generated by applying a perturbation to the first answer. The perturbation applied to the first answer may also cause the context to be perturbated to obtain a perturbated context. In some examples, the perturbated context includes the perturbated answer in lieu of one or more recitations of the first answer within the context. The query and the perturbated context may be input to the artificial intelligence model to obtain a second answer. The second answer may then be analyzed with respect to the perturbated first answer. For example, the second answer aligning with the perturbated first answer indicates that the artificial intelligence model leveraged the perturbated context to generate the second answer. However, if the second answer does not align with the perturbated first answer, then this can indicate that the artificial intelligence model did not use the perturbated context to generate the second answer. A label can be assigned to the second answer based on the similarity score. For example, if the similarity score is greater than a first threshold, which can be indicative of the trained artificial intelligence model having used the perturbated context to generate the second answer, then the assigned label can have a first value. If, however, the similarity score is less than a second threshold, which can be indicative of the trained artificial intelligence model having used model memory to generate the second answer, then the assigned label can have a second value. If the similarity score is equal to or greater than the second threshold and also less than or equal to the first threshold, then the corresponding sample can be discarded as the model did not use context or memory to generate the answer.

A sample set of token activations associated with the artificial intelligence model can be extracted from an output layer of the artificial intelligence model. In some examples, the artificial intelligence model may have accessible token activations. These token activations may relate to the generation of the second answer by the artificial intelligence model based on the query and the perturbated context. The training sample, for instance, may include the corresponding sample set of token activations and the label (e.g., ground truth). The classification model can then be trained, using the training data, to determine whether an answer generated by an artificial intelligence model was based on provided context or model memory.

Figure 8A:
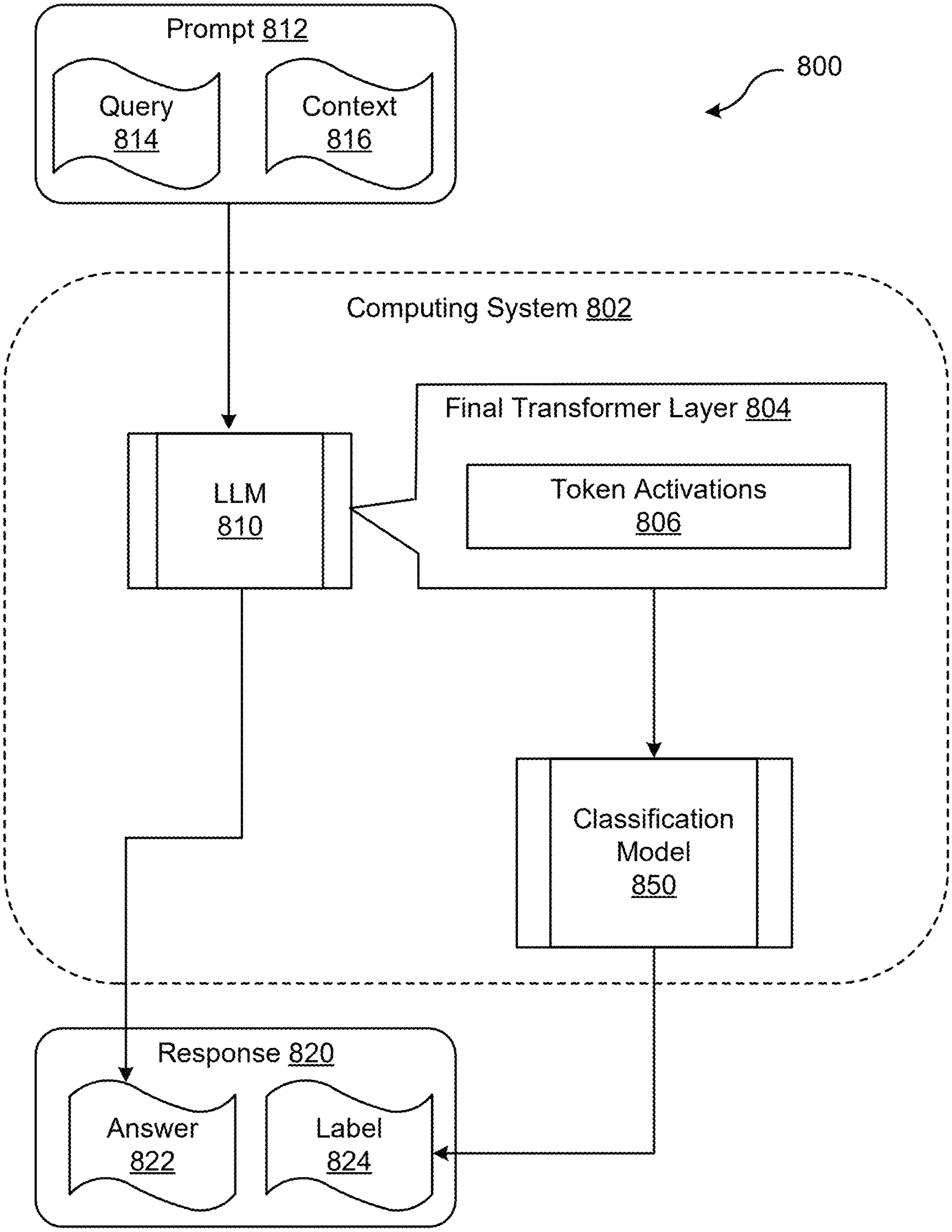
FIG. 8A is an illustrative system for determining a context source of an answer generated by an LLM with which token activations are accessible, in accordance with one or more embodiments.

FIG. 8A is an illustrative system for determining a context source of an answer generated by an LLM with which token activations are accessible, in accordance with one or more embodiments. In some embodiments, system 800 of FIG. 8A includes a computing system 802. Computing system 802 can be implemented using some or all of the aspects of FIG. 1. For example, one or more functions of computing system 802 may be performed using cloud components 110 of system 100. For simplicity, LLM 810 and classification model 850 are illustrated as components of computing system 802 to illustrate that LLM 810 refers to a model whose final transformer layer is accessible such that token activations can be extracted and used as input to classification model 850.

In some embodiments, system 800 may include a prompt 812 being provided, as input, to LLM 810. For example, computing system 802 may be configured to receive prompt 812 and provide prompt 812 to LLM 810. Prompt 812 can include a query 814 and a context 816. Query 814 represents a question or instruction that directs LLM 810 to extract or generate information (e.g., an answer 822) based on any accompanying context (e.g., context 816). Context 816 represents background information or supporting information (e.g., text, documents, videos, etc.) to help LLM 810 interpret and respond to query 814. Computing system 802 may be configured to perform one or more prompt engineering steps to prompt 812 prior to being input to LLM 810. For example, computing system 802 can identify data to be included as context 816 of prompt 812.

In some embodiments, LLM 810 may be the same or similar to that of AI model 510 of FIG. 5, and the previous description may apply. Additionally, classification model 850 may be the same or similar to that of classification model 550 of FIG. 5, and the previous description may apply.

Prompt 812 can be provided to LLM 810, which can be used to generate answer 822 to query 814. LLM 810 can be configured to use pre-trained knowledge as well the provided context (e.g., context 816). While the pre-trained knowledge is helpful to generate responses, some embodiments include LLM 810 using context 816 rather than relying solely on pre-trained memory (e.g., model memory) when generating responses. For example, the context can ensure that the answers are accurate and relevant to the specific query. Pre-trained memory may include outdated, overgeneralized, or even incorrect information, whereas the context provides up-to-date and specific details. Moreover, using context can increase response consistency. For example, if LLM 810 relied on model memory, the generated answers may be inconsistent due to the vast and varied information that LLM 810 was trained on. However, for certain applications, such as healthcare, finance, legal, educational, and the like, the trustworthiness and reliability of the responses is significantly improved by leveraging the context. Context 816 can enable LLM 810 to adapt to domain-specific applications, as solely relying on the model memory can cause incorrect or irrelevant responses to be trained. For example, the pre-trained memory might not cover all domain-specific nuances, whereas the context can provide necessary and specific details to generate accurate responses.

As an illustrative example, consider an example query and context:

Query (Q): "What caused the Great Fire of London?"

Original Context (C): "The Great Fire of London started on Sep. 2, 1666, in a bakery on Pudding Lane. It was caused by a spark from the bakery oven that ignited the wooden structure of the building. The fire spread rapidly due to strong winds and the close proximity of wooden buildings."

In some embodiments, prompt 812, including query 814 (e.g., query (Q)) and context 816 (e.g., context (C)), can be input to LLM 810. Computing system 802 may be configured to receive prompt 812 from a client device (e.g., mobile device 122, user terminal 124 of FIG. 1) and input prompt 812 to LLM 810. In some embodiments, LLM 810 may have an accessible final transformer layer 804 (and/or other layers) that allows computing system 802 to extract token activations 806. Token activations 806 correspond to the token activations associated with answer 822 being generated. For example, in final transformer layer 804, token activations are generated for each token in the answer. These activations represent an internal state of LLM 810 and an importance assigned to each token by LLM 810. In the illustrative example, LLM 810 may be configured to generate an answer (A) in response to a prompt including query (Q) and context (C): Answer (A): "A spark from the bakery oven."

Token activations 806 associated with the generation of answer 822 (e.g., answer (A)), may indicate higher activations for certain tokens (e.g., "spark," "bakery," and "oven"). These higher activations may indicate that those tokens have a greater importance to the generation of answer 822 based on context 816.

In parallel to LLM 810 forming answer 822, computing system 802, as mentioned above, can extract token activations 806 corresponding to answer 822. Token activations 806 may be provided, as input, to classification model 850. Classification model 850 may be configured to receive a set of token activations and determine, based on those token activations, whether LLM 810 generated answer 822 using context 816 or model memory. Classification model 850 can output a label 824 indicating whether answer 822 was generated by LLM 810 using context 816 or model memory. For example, if LLM 810 generated answer 822 using context 816, label 824 may be a first label. If LLM 810 did not generate answer 822 using context 816, label 824 may be a second label. In some embodiments, classification model 850 may include a model, such as an LSTM model, to transform token activations 806 into a representation that can be passed to a classifier head to classify the token activations as representing an answer produced by LLM 810 using context or model memory.

In some embodiments, computing system 802 may be configured to output a response 820 to prompt 812. Response 820 may include answer 822 and label 824. For example, response 820 can include answer (A): "A spark from the bakery oven," as well as an indication that this answer was generated by LLM 810 using context (C), such as "Context-Based Answer," or another indicator.

As mentioned above, some embodiments include computing system 802 generating a graphical user interface and providing the graphical user interface to a client device, where the graphical user interface displays prompt 820 including answer 822 and label 824.

Figure 8B:
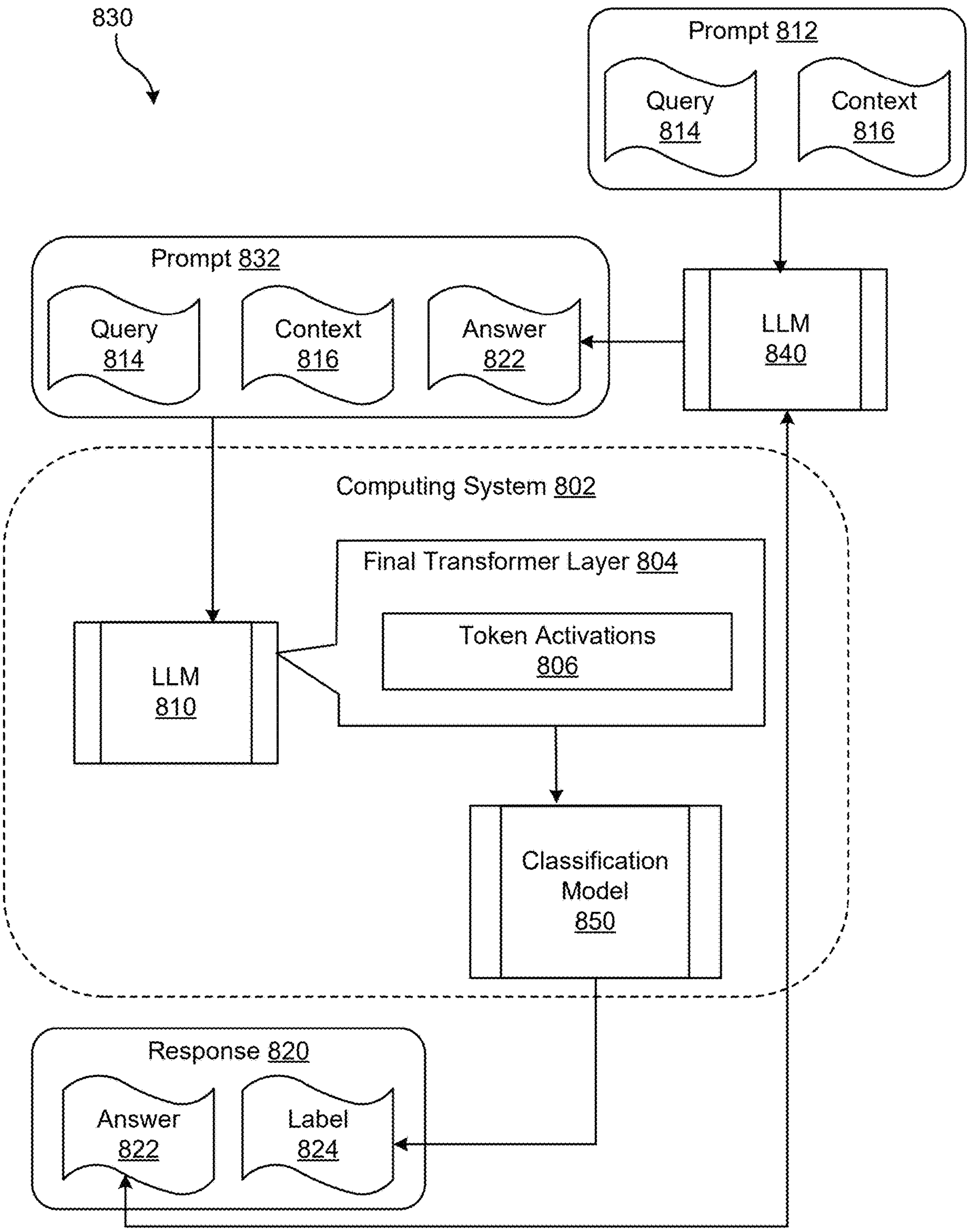
FIG. 8B is an illustrative system for determining a context source of an answer generated by a LLM with which token activations are not accessible using a LLM with which token activations are accessible, in accordance with one or more embodiments.

FIG. 8B is an illustrative system 830 for determining a context source of an answer generated by a LLM with which token activations are not accessible using a LLM with which token activations are accessible, in accordance with one or more embodiments. In some embodiments, system 830 may include one or more similar components as depicted by system 800 of FIG. 8A, and the previous descriptions can apply.

System 830 relates to a scenario where prompt 812 is provided to another model, such as LLM 840, to generate answer 822. For example, a client device (e.g., mobile device 122, user terminal 124 of FIG. 1) can input prompt 812, including query 814 and context 816, to LLM 840. LLM 840 may be implemented by a computing system/server/environment different from that of LLM 810 (and classification model 850). In some examples, token activations of LLM 840 may not be accessible to computing system 802.

As token activations of LLM 840 are not available in some embodiments, computing system 802 may be configured to leverage a known model having accessible token activations to serve as a proxy for the token activations associated with LLM 840 generating answer 822. For example, if LLM 810 is considered for the model having accessible tokens, computing system 802 may be configured to receive a request 832 including query 814, context 816, and answer 822. Request 832 may be received from LLM 840. For example, LLM 840 can leverage computing system 802 (including LLM 810 and classification model 850) to provide feedback with its generated response that allows a recipient to know whether LLM 840 used context 816 to generate answer 822 or model memory (of LLM 840). In some embodiments, request 832 may be submitted by a client device. For example, the client device can provide prompt 812 to LLM 840 and may receive answer 822. In this example, upon receiving answer 822, the client device can create and transmit request 832 to computing system 802 to provide support for answer 822's creation. For example, after submitting prompt 812, including query 814 and context 816, to LLM 840, a client device can receive answer 822. To ensure that LLM 840 utilized context 816 to generate answer 822, and not model memory, the client device can provide request 832 to computing system 802.

Computing system 802 can provide request 832 to LLM 810. LLM 810 can use query 814, context 816, and answer 822 (e.g., a QCA triplet) to recreate the token activations generated by LLM 840 when LLM 840 generated answer 822. As final transformer layer 804 of LLM 810 is accessible to computing system 802, token activations 806 can be extracted. Here, token activations 806 represent the token activations generated by LLM 810 when recreating generation of answer 822 based on input prompt 812 including query 814 and context 816.

In some embodiments, as detailed above with respect to FIG. 8A, classification model 850 may be trained to determine, based on an input set of token activations (e.g., token activations 806), whether a model leveraged context or model memory to generate an answer. For example, classification model 850 can output label 824 based on whether token activations 806 indicate that answer 822 was likely generated by LLM 840 using context 816 or model memory. In some embodiments, response 820 may be provided back to LLM 840 as an updated response to prompt 812. For example, LLM 840 may provide, in response to prompt 812, answer 822 to a requesting client device. Subsequent to having computing system 802 analyze the QCA triplet formed from query 814, context 816, and answer 822, an updated response including answer 822 and label 824 can be provided to the requesting client device.

Flowcharts

Figure 9:
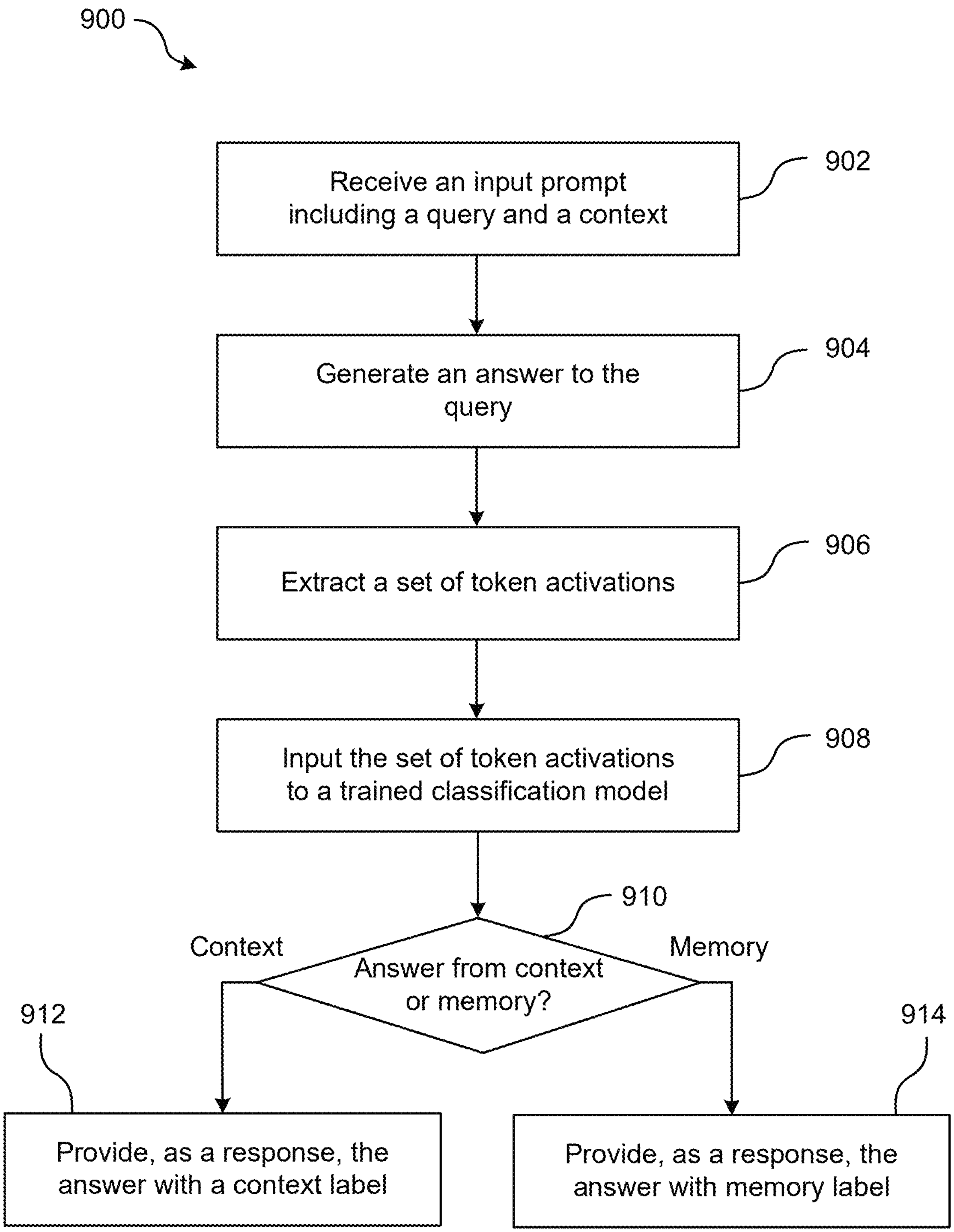
FIG. 9 is an illustrative flowchart of an example process for determining whether a token activation-accessible artificial intelligence model generated an answer, in response to an input prompt including a query and a context, based on the context or model memory, in accordance with one or more embodiments.

FIG. 9 is an illustrative flowchart of an example process 900 for determining whether a token activation-accessible artificial intelligence model generated an answer, in response to an input prompt including a query and a context, based on the context or model memory, in accordance with one or more embodiments. In some embodiments, process 900 can be implemented using one or more components of system 100. In some embodiments, for example, process 900 can be implemented using one or more components of system 800. For example, computing system 802 can be implemented using some or all of the aspects of FIG. 1, and one or more functions of computing system 802 may be performed using cloud components 110 of system 100.

Process 900 may be configured to detect whether large language model outputs were generated using model memory instead of input context. In some embodiments, process 900 may begin at step 902. At step 902, an input prompt including a query and a context may be received. For example, input prompt 812 can be received including query 814 and context 816. In some embodiments, the context (e.g., context 816) can include at least one recitation of an expected answer to the query (e.g., query 814). The expected answer refers to an answer that a model would be expected to produce if it properly responded to an input prompt (e.g., including the query and context). As an illustrative example, consider an example query, context, and ground-truth answer: Query (Q): "Why did Ray Eberle die?"

Original Context (C): "Ray Eberle died of a heart attack in Douglasville, Georgia on Aug. 25, 1970, aged 60.

Ground Truth Answer (A): "Heart attack."

In this example, the context (C) (e.g., context 816) includes at least one recitation of the expected answer, which can serve as ground truth.

At step 904, an answer to the query may be generated. In some embodiments, the first answer may be generated using a trained large language model. The trained large language model may generate the first answer (A1), based on the input prompt. For example, LLM 810 may be configured to generate answer 822 in response to receiving prompt 812, including query 814 and context 816. In some embodiments, the first answer being generated includes the trained large language model tokenizing the input into a plurality of tokens. These tokens can include query tokens representing the query (Q) and context tokens representing the context (C). The query tokens and the context tokens can be used to determine one or more answer tokens that represent the first answer (A1).

At step 906, a set of token activations may be extracted. The token activations may be associated with the first answer's generation by the trained large language model. In some embodiments, token activations can be extracted from an output layer of the trained large language model. For example, token activations 806 can be extracted (e.g., using computing system 802). In some examples, token activations 806 may be extracted from a feed forward layer (e.g., feed forward layer 512) serving as the output layer (e.g., final transformer layer). In some examples, extracting the set of token activations can include performing a single forward pass through the trained large language model (e.g., LLM 810). This can improve model efficiency because not only will an answer to a query be generated, but a determination of how likely it is that the model used the provided context to generate the answer can also be provided. Moreover, because the determination of whether or not the model-produced answer (e.g., answer 822) is based on the provided context can be performed in parallel to the model's answer generation process, fewer computational resources can be used. Furthermore, the time to respond to an input prompt but also including a label indicating a likelihood that the model used the provided context to generate the answer can be significantly reduced, further improving model accuracy, efficiency, and trustworthiness. In some embodiments, the set of token activations (e.g., token activations 806) can include a vector of logit values extracted from the output layer. For example, the set of token activations can be generated such that it includes a subset of logit values from the vector of logit values associated with the trained large language model (e.g., LLM 810) generating the first answer (A1).

At step 908, the set of token activations may be input to a trained classification model. For example, the trained classification model (e.g., classification model 850) may be trained to learn how token activations behave when generating an answer based on provided context as compared to model memory. In some embodiments, computing system 802 can, responsive to extracting token activations 806, provide token activations 806 as input to classification model 850.

At step 910, a determination can be made as to whether the first answer was generated using context or memory. If, at step 910, it is determined that the first answer was generated using context, process 900 may proceed to step 912. At step 912, a context label may be assigned to the first answer. For example, the first answer may be stored with a label (e.g., label 824) indicating that the set of token activations (e.g., token activations 806) was generated by the trained large language model (e.g., LLM 810) using the context (e.g., context 816) included in the input prompt (e.g., prompt 812).

If, at step 910, it is determined that the first answer was generated using model memory, process 900 may proceed to step 914. At step 914, a memory label may be assigned to the first answer. For example, the first answer may be stored with a label (e.g., label 824) indicating that the set of token activations (e.g., token activations 806) was generated by the trained large language model (e.g., LLM 810) using the model memory as opposed to the context (e.g., context 816) included in the input prompt (e.g., prompt 812).

The set of token activations can, for example, include a first set of token activations including a first label. In this example, for the trained large language model using the memory to generate the first answer instead of the context, the trained large language model may be configured to generate a second answer to the query using the input prompt. A second set of token activations can be extracted from an output layer. The token activations may be associated with the second answer being generated. The second set of token activations can be input to the trained classification model to obtain a second label. For example, the second label can indicate whether the second answer was generated using the context or the memory. An updated response can be generated and provided, to respond to the input prompt, including the second answer with the second label. The second label can be included within the updated response based on the second label indicating that the second answer was generated by the trained large language model using the context of the input prompt.

The trained large language model (e.g., LLM 810) may correspond to a Retrieval-Augmented Generation model. In this example, the memory associated with the trained large language model includes one or more account databases. A determination can be made, based on the label, whether the first answer was generated by the Retrieval-Augmented Generation model using the account databases. If so, the input prompt can be re-input to the Retrieval-Augmented Generation model to obtain a second answer to the query. In some cases, the input prompt can be provided to back to the trained large language model with the first answer and an instruction indication that the first answer was incorrect and/or to use the context provided with the input prompt to generate the second answer. The second answer with an updated label may be provided an updated response to the input prompt. The updated label may indicate, for example, that the second answer was generated by the Retrieval-Augmented Generation model using the context. In some examples, a computing system can update the input prompt to include an instruction to cause the Retrieval-Augmented Generation model to leverage the context of the input prompt to generate responses.

Figure 10:
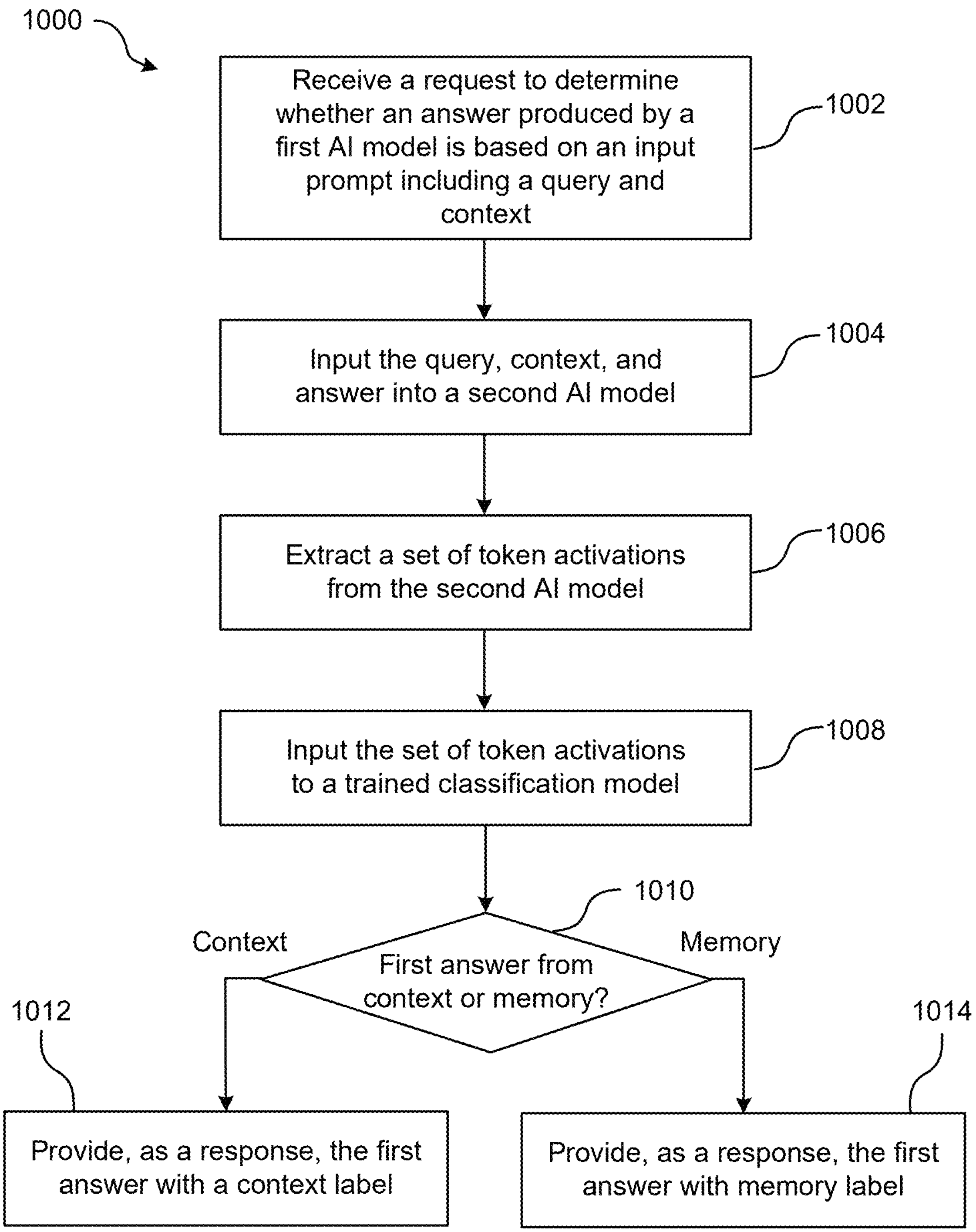
FIG. 10 is an illustrative flowchart of an example process for determining whether an artificial intelligence model for which token activations are not accessible generated an answer, in response to an input prompt including a query and a context, based on the context or model memory, in accordance with one or more embodiments.

FIG. 10 is an illustrative flowchart of an example process 1000 for determining whether an artificial intelligence model whose token activations are not accessible generated an answer, in response to an input prompt including a query and a context, based on the context or model memory, in accordance with one or more embodiments. In some embodiments, process 1000 can be implemented using one or more components of system 100. In some embodiments, for example, process 1000 can be implemented using one or more components of system 830. For example, computing system 802 can be implemented using some or all of the aspects of FIG. 1, and one or more functions of computing system 802 may be performed using cloud components 110 of system 100.

Process 1000 may be configured to determine whether an external large language model is leveraging model memory or input context to generate responses. In some embodiments, process 1000 may begin at step 1002. At step 1002, a request to determine whether an answer produced by a first AI model based on an input prompt including a query and a context is based on the context or model memory. In some embodiments, the first AI model may correspond to a large language model for which token activations are not accessible. For example, with reference to FIG. 8B, prompt 812, including query 814 and context 816, can be input to LLM 840. In the illustrative example, token activations from LLM 840 may not be available.

To address this technical challenge, a second AI model, which may be the same or similar to the first AI model (e.g., a same type of large language model), may be used. This second AI model may have an accessible output layer, allowing token activations to be extracted. In some embodiments, the query, context, and/or answer (e.g., the QCA triplet) may be extracted from the request. For example, because token activations used by LLM 840 when generating answer 822 are not available to be extracted, request 832, including query 814, context 816, and answer 822 (generated by LLM 840) can be provided to LLM 810. As token activations of LLM 810 may be accessible, LLM 810 can be used to reconstruct the token activations produced by LLM 840 when generating answer 822. The context, for example, may include at least one recitation of an expected answer to the query. The expected answer refers to an answer that a model would be expected to produce if it properly responded to an input prompt (e.g., including the query and context). As an illustrative example, consider an example query, context, and ground-truth answer:

Query (Q): "Why did Ray Eberle die?"

Original Context (C): "Ray Eberle died of a heart attack in Douglasville, Georgia on Aug. 25, 1970, aged 60.

Ground Truth Answer (A): "Heart attack."

In this example, the context (C) includes at least one recitation of the expected answer, which can serve as ground truth.

At step 1004, the input query, context, and answer (e.g., a QCA triplet) may be input to the second AI model. For example, request 832, including the QCA triplet, can be provided from the first AI model (e.g., LLM 840), of which token activations are not accessible, to the second AI model, which has accessible token activations (e.g., LLM 810). The second AI model may be configured to reconstruct the token activations by generating the answer based on the input prompt including the query and the context. This can include token activations from a final layer of the second AI model being modeled.

At step 1006, a set of token activations can be extracted from the second AI model. These token activations correspond to token activations generated by the second AI model while generating the answer in response to the input prompt including the query and the context. In some embodiments, the token activations can be extracted from an output layer of the second AI model. The second AI model may, for example, be trained to model token activation patterns of the first AI model. The token activations may be extracted, in some embodiments, from a feed forward layer of the second AI model. For example, these token activations may correspond, respectively, to tokens used by the second AI model to generate the answer. In some embodiments, extraction of the set of token activations may include a single forward pass through the second AI model. This can improve providing quick analysis of a likelihood that the first AI model used the provided context to generate the answer. Moreover, because the determination of whether or not the answer is based on the provided context can be performed using the already generated QCA triplet (i.e., where the answer (A) was generated by the first AI model of which token activations are not accessible), fewer computational resources can be used. Furthermore, the time to respond to an input prompt but also including a label indicating a likelihood that the model used the provided context to generate the answer can be significantly reduced, further improving model accuracy, efficiency, and trustworthiness. In some embodiments, the set of token activations can include a vector of logit values extracted from the output layer. For example, the set of token activations can be generated such that it includes a subset of logit values from the vector of logit values associated with the trained large language model (e.g., AI model 510) generating the first answer (A1). In some embodiments, a model type of the second AI model can be selected based on a model type of the first AI model. For example, if the first AI model corresponds to an LLM, then the second AI model can be selected to also correspond to an LLM (e.g., a same version of the model). As an illustrative example, if the first AI model is a RAG model, the second AI model may also be chosen to be the RAG model.

At step 1008, the set of token activations (e.g., token activations 806) can be input to a trained classification model (e.g., classification model 850). In some embodiments, the classification model may be used to obtain a label (e.g., label 824) indicating whether the first AI model used the provided context or model memory to generate the answer (e.g., answer 822). A number of token activations included in the set of token activations can also be determined. An input size of the classification model can be set such that it is the same (e.g., equal to) the number of token activations associated with the generated answer.

At step 1010, a determination may be made as to whether the first answer was generated by the first AI model (e.g., LLM 840) using provided context or model memory. In some embodiments, the determination performed at step 1010 may leverage the token activations of the second AI model (e.g., LLM 810) to approximate the token activations of the first AI model, which are not accessible.

If, at step 1010, the answer is determined to be generated using the provided context, process 1000 can proceed to step 1012. At step 1012, it is determined that the first answer was generated using context, process 1000 may proceed to step 1012. At step 1012, a context label may be assigned to the first answer. For example, the answer (e.g., answer 822) may be stored with a label (e.g., label 824) indicating that the set of token activations (e.g., token activations 806) was likely generated by the first trained large language model (e.g., LLM 840) using the context (e.g., context 816) included in the input prompt (e.g., prompt 812).

If, at step 1010, it is determined that the answer was likely generated by the first AI model using model memory, process 1000 may proceed to step 1014. At step 1014, a memory label may be assigned to the first answer. For example, the answer (e.g., answer 822) may be stored with a label (e.g., label 824) indicating that the set of token activations was likely generated by the first trained large language model (e.g., LLM 840) using the model memory.

In some embodiments, if response 820 indicates that the answer (e.g., answer 822) may was likely generated using the model memory, an instruction can be generated and provided to the first AI model (e.g., LLM 840) to generate a different answer using the context from the input prompt. For example, if the answer corresponds to a first answer, an instruction may be generated to cause the first AI model (e.g., LLM 840) and/or to the second AI model (e.g., LLM 810) to generate, based on the input prompt, a second answer in response to the input prompt. In this example, the response may include the second answer as an alternative to the first answer. The instruction may cause the second AI model to focus on the provided context to improve the quality of the answer (with respect to the first answer).

Figure 11:
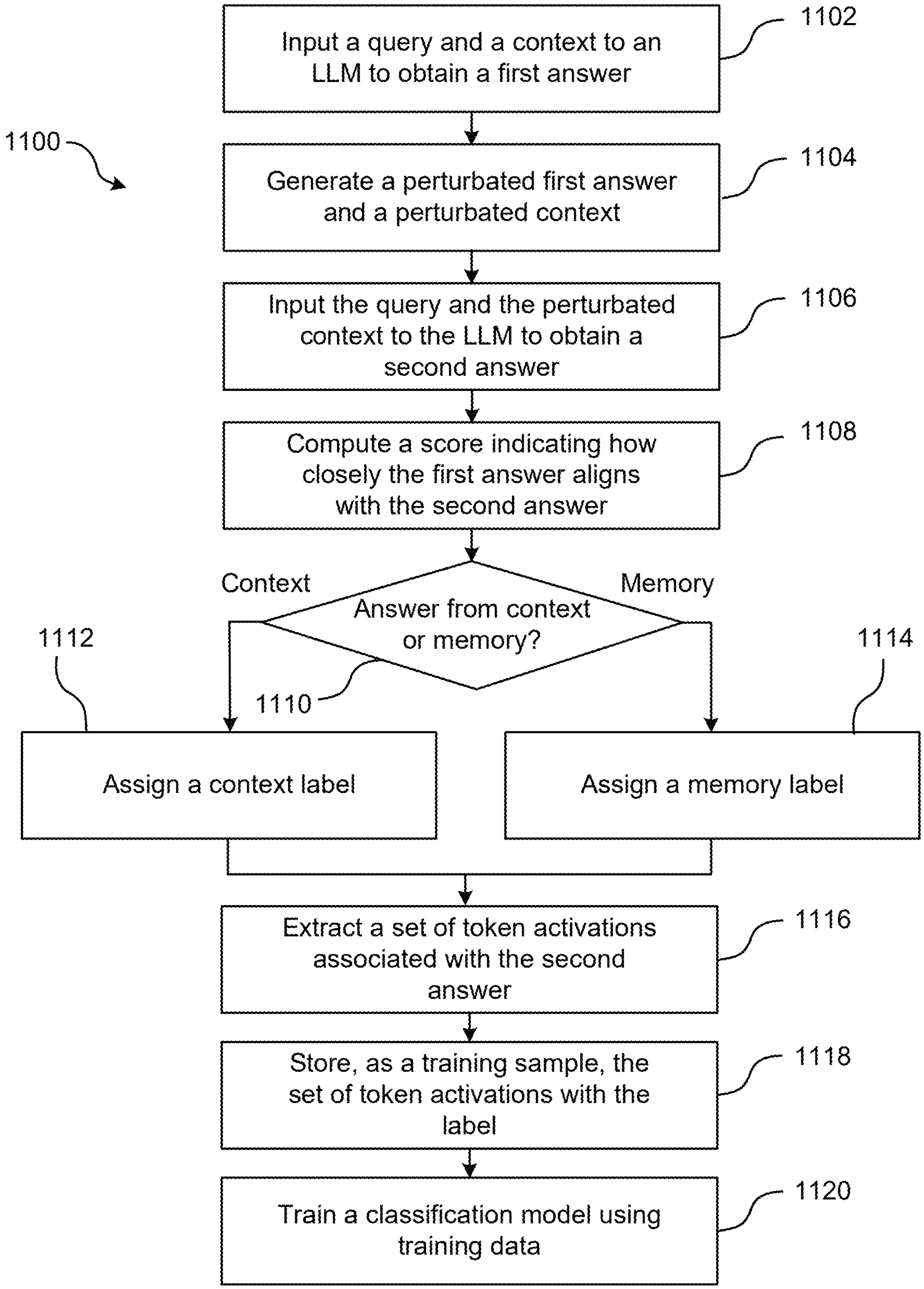
FIG. 11 is an illustrative flowchart of an example process for generating training data and training a classification model using the training data to determine whether an answer was generated by an artificial intelligence model using provided context or model memory, in accordance with one or more embodiments.

FIG. 11 is an illustrative flowchart of an example process 1100 for generating training data and training a classification model using the training data to determine whether an answer was generated by an artificial intelligence model using provided context or model memory, in accordance with one or more embodiments. In some embodiments, process 1100 can be implemented using one or more components of system 100. In some embodiments, for example, process 1100 can be implemented using one or more components of system 800 or 830 of FIG. 8A or 8B, respectively. For example, computing system 802 can be implemented using some or all of the aspects of FIG. 1, and one or more functions of computing system 802 may be performed using cloud components 110 of system 100.

Process 1100 may configure a classification model to determine whether answers generated by a large language model are based on contexts included in corresponding input prompts provided to the large language model or model memory of the large language model. In some embodiments, process 1100 may begin at step 1102.

At step 1102, a query and a context can be input to a large language model (LLM) to obtain a first answer. In some examples, the LLM refers to a trained LLM. In some examples, the trained LLM may have an accessible final transformer layer, which can allow token activations associated with the generation of an answer by the trained LLM to be extracted.

At step 1104, a perturbated first answer and a perturbated context may be generated. In some embodiments, a perturbated first answer and a perturbated context can be generated by applying a perturbation to the first answer. For example, the perturbated context may include (e.g., at least one recitation of) the perturbated first answer. The perturbation that is applied can be a random perturbation, a controlled perturbation, or another type of perturbation, or a combination thereof. The random perturbation may include replacing a random word of the first answer inside the context to create the perturbated context. The controlled perturbation may include replacing an entity of the first answer with a random entity of a same type. The perturbated context can be generated by inserting at least one recitation of the perturbated first answer within the perturbated context. For example, inserting the at least one recitation of the perturbated first answer can include replacing a recitation of the first answer within the context with the perturbated first answer to form the perturbated context.

At step 1106, the query and the perturbated context may be input to the LLM (e.g., the trained LLM whose token activations are accessible). The LLM may, in response to the input, output a second answer.

At step 1108, a score can be computed to indicate how closely the first answer aligns with the second answer. In some embodiments, the score can represent how closely the perturbated first answer and the second answer align with the perturbated context. In other words, if the LLM leverages the provided context (e.g., the perturbated context), then the output of the LLM, when provided with a perturbated input prompt including the query and the perturbated context, would be expected to be the perturbated answer. However, if the LLM did not leverage the provided context (e.g., the perturbated context), then the output of the LLM, when provided with the perturbated input prompt, may differ from the perturbated answer included within the provided context.

At step 1110, a determination may be made as to whether the second answer was generated based on the perturbated context or model memory. For example, the score can represent a similarity score computed using a similarity metric. If the similarity score is greater than a first threshold, then this may indicate that the trained large language model used the perturbated context to generate the second answer. If the similarity score is less than a second threshold, this may indicate that the trained large language model used model memory to generate the second answer. In some embodiments, the score includes an alignment score. The alignment score can indicate how closely a given answer aligns with an expected answer. For example, computing the alignment score can include generating embeddings of the given answer and the expected answer and computing a similarity between the given answer and the expected answer based on the embeddings.

If, at step 1110, it is determined that the second answer aligns with the perturbated context, then process 1100 may process to step 1112. At step 1112, a first label (e.g., a context label) can be assigned to a data structure including the query, the perturbated context, and the perturbated answer. The first label may indicate that the second answer aligns with the perturbated context. In some embodiments, the data structure may include the original QCA triplet, the perturbated QCA triplet, the second answer, the token activations extracted generating the second answer, and the first label.

If, however, at step 1110, it is determined that the second answer does not align with the perturbated context, process 1100 may proceed to step 1114. At step 1114, a second label (e.g., a memory label) can be assigned to a data structure including the query, the perturbated context, and the perturbated answer. The second label may indicate that the second answer does not align with the perturbated context. In some embodiments, the data structure may include the original QCA triplet, the perturbated QCA triplet, the second answer, the token activations extracted generating the second answer, and the first label.

After steps 1112 and 1114, process 1100 may proceed to step 1116.

At step 1116, a set of token activations associated with the second answer may be extracted from. As mentioned above, in example process 1100, the trained large language model may have an accessible output layer, allowing the token activations to be extracted. These token activations can exhibit different patterns when the large language model leverages provided context to generate an answer as compared to when it uses model memory.

At step 1118, the set of token activations and the assigned label may be stored as a training sample.

At step 1120, a classification model can be trained using the training data. The training data, for example, can include the training sample.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method for determining whether a model used provided context or model memory to respond to a prompt.

A2. The method of embodiment A1, comprising: receiving, from a client device, an input prompt comprising a query and a context; generating, using a trained large language model, based on the input prompt, a first answer to the query; extracting, from an output layer of the trained large language model, a set of token activations associated with the first answer being generated; inputting the set of token activations to a trained classification model to obtain a label indicating that the first answer was generated using the context or memory associated with the trained large language model; and providing, as a response to the input prompt, the first answer with the label.

A3. The method of embodiment A2, wherein receiving the input prompt comprises: receiving the context comprising at least one recitation of an expected answer to the query.

A4. The method of any one of embodiments A2-A3, wherein generating the first answer comprises: tokenizing the input prompt into a plurality of tokens; and determining, based on the plurality of tokens, one or more tokens forming the first answer.

A5. The method of any one of embodiments A2-A4, wherein extracting the set of token activations comprises: extracting one or more token activations from a feed forward layer serving as the output layer of the trained large language model.

A6. The method of any one of embodiments A2-A5, wherein extracting the set of token activations comprises: performing a single forward pass through the trained large language model.

A7. The method of any one of embodiments A2-A6, wherein the set of token activations comprise a first set of token activations and the label comprises a first label, the method further comprises: generating, based on the trained large language model using the memory to generate the first answer instead of the context, a second answer to the query using the input prompt; extracting, from the output layer, a second set of token activations associated with the second answer being generated; and inputting the second set of token activations into the trained classification model to obtain a second label indicating that the second answer was generated using the context or the memory.

A8. The method of embodiment A7, further comprising: providing, as an updated response to the input prompt, the second answer with the second label based on the second label indicating that the second answer was generated by the trained large language model using the context of the input prompt.

A9. The method of any one of embodiments A2-A8, wherein extracting the set of token activations comprises: extracting a vector of logit values from the output layer; and generating the set of token activations comprising a subset of logit values from the vector of logit values associated with the trained large language model generating the first answer.

A10. The method of any one of embodiments A2-A9, wherein the trained large language model comprises a Retrieval-Augmented Generation model and the memory associated with the trained large language model comprises one or more account databases, the method further comprises: determining, based on the label, that the first answer was generated by the Retrieval-Augmented Generation model using the one or more account databases; generating, using the Retrieval-Augmented Generation model, based on the input prompt, a second answer to the query; and providing, as an updated response to the input prompt, the second answer with an updated label indicating that second answer was generated by the Retrieval-Augmented Generation model using the context.

A11. The method of embodiment A10, wherein generating the second answer comprises: updating the input prompt to comprise an instruction to cause the Retrieval-Augmented Generation model to leverage the context of the input prompt to generate responses.

A12. The method of any one of embodiments A2-A11, wherein generating the first answer comprises: generating the first answer using a determined number of tokens, wherein the determined number of tokens is equal to a quantity of token activations included in the set of token activations.

A13. The method of any one of embodiments A2-A12, further comprising: generating training data for training a classification model to obtain the trained classification model, wherein the training data comprises labeled samples comprising a first label indicating that the trained large language model used input context to generate a corresponding answer or a second label indicating that the trained large language model failed to use the input context to generate the corresponding answer.

A14. The method of embodiment A13, further comprising: generating the labeled samples using a plurality of training query-context-answer triplets each comprising a training query, a training context, and a training answer; for each of the plurality of training query-context-answer triplets: applying a perturbation to the training answer to generate a perturbated answer and a perturbated context including at least one recitation of the perturbated answer; inputting a perturbated training prompt comprising the training query and the perturbated context into the trained large language model to obtain a training predicted answer; and assigning a first label to the training predicted answer based on the training predicted answer comprising the perturbated answer or a second label to the training predicted answer based on the training predicted answer comprising an answer different from the perturbated answer.

A15. The method of embodiment A14, wherein applying the perturbation comprises: applying a random perturbation to the training answer by replacing a random word of the training answer to obtain the perturbated answer, wherein the perturbated context includes at least one recitation of the training answer comprising the random word replaced.

A16. The method of any one of embodiments A14-A15, wherein apply the perturbation comprises: applying a controlled perturbation to the training answer by replacing at least one entity represented within the training answer by a random entity of at least a same entity type.

A17. The method of any one of embodiments A14-A16, wherein assigning the first label or the second label comprises: computing an answer alignment score based on how closely the training predicted answer aligns with the perturbated answer.

A18. The method of embodiment A17, wherein assigning the first label or the second label comprises: assigning the first label to the training predicted answer based on the answer alignment score being greater than a first threshold alignment score; or assigning the second label to the training predicted answer based on the answer alignment score being less than a second threshold alignment score.

A19. The method of any one of embodiments A13-A18, further comprising: extracting training sets of token activations respectively associated with the labeled samples, wherein the training sets of token activations correspond to token activations of the output layer of the trained large language model during generation of the corresponding answer; training, using the training sets of token activations and the labeled samples, the trained classification model to predict that a given answer was generated by the trained large language model using the memory or a given context. A20. The method of any one of embodiments A1-A19, comprising: inputting a prompt comprising a query and a context into a trained large language model to obtain an answer to the query; determining token activations associated with the answer during generation by the trained large language model; inputting the token activations to a trained classification model to obtain a label indicating that the answer was generated using the context or memory associated with the trained large language model; and providing, as a response to the prompt, the answer with the label.

B1. A method for determining whether an external large language model is leveraging model memory or input context to generate responses.

B2. The method of embodiment B1, comprising: receiving, from a client device, a request to determine whether an answer generated by a first large language model responding to an input prompt comprising a query and a context was based on model memory of the first large language model or the context, wherein access to token activations of the first large language model is unavailable; extracting, from a second large language model that receives, as input, (i) the query, (ii) the context, and (iii) the answer, a set of token activations associated with the second large language model generating the answer; inputting the set of token activations to a classification model to obtain a label indicating that, to generate the answer, the first large language model used the context or the model memory; and providing, to the client device, a response to the request comprising the answer and the label.

B3. The method of embodiment B2, wherein extracting the set of token activations comprises: extracting, from an output layer of the second large language model, the set of token activations.

B4. The method of any one of embodiments B2-B3, wherein receiving the request comprises: extracting, from the request, the query and the context, wherein the context comprises at least one recitation of an expected answer to the query.

B5. The method of any one of embodiments B2-B4, wherein the second large language model is trained to model token activation patterns of the first large language model.

B6. The method of any one of embodiments B2-B5, wherein extracting the set of token activations comprises: extracting one or more token activations from a feed forward layer of the second large language model, the one or more token activations respectively corresponding to one or more tokens used to generate the answer.

B7. The method of any one of embodiments B2-B6, wherein extracting the set of token activations comprises: performing a single forward pass through the second large language model.

B8. The method of any one of embodiments B2-B7, further comprising: determining, based on the label generated by the classification model using the set of token activations extracted from the second large language model, that the first large language model generated the answer using the model memory; and generating and providing an instruction to the first large language model to generate a different answer using the context from the input prompt.

B9. The method of embodiment B8, wherein the answer comprises a first answer, the method further comprises: generating, using the second large language model, based on the input prompt, a second answer responding to the input prompt, wherein the response comprises the second answer as an alternative to the first answer.

B10. The method of any one of embodiments B2-B9, wherein extracting the set of token activations comprises: extracting a vector of logit values from an output layer; and generating the set of token activations comprising a subset of logit values from the vector of logit values associated with the second large language model generating the answer.

B11. The method of any one of embodiments B2-B10, further comprising: determining a number of token activations included in the set of token activations, wherein an input size of the classification model is set to equal to the number of token activations.

B12. The method of any one of embodiments B2-B11, further comprising: generating training data used to train the classification model to predict whether the first large language model generates answers using contexts or the model memory.

B13. The method of embodiment B12, further comprising: retrieving a plurality of training query-context-answer triplets each comprising a training query, a training context, and a training answer; for each of the plurality of training query-context-answer triplets: applying a perturbation to the training answer to generated a perturbated answer and a perturbated context including at least one recitation of the perturbated answer; inputting a perturbated training prompt comprising the training query and the perturbated context into the second large language model to obtain a training predicted answer; and assigning a first label to the training predicted answer based on the training predicted answer comprising the perturbated answer or a second label to the training predicted answer based on the training predicted answer comprising an answer different from the perturbated answer.

B14. The method of embodiment B13, wherein applying the perturbation comprises: applying a random perturbation to the training answer by replacing a random word of the training answer to obtain the perturbated answer, wherein the perturbated context includes at least one recitation of the training answer comprising the random word replaced.

B15. The method of any one of embodiments B13-B14, wherein apply the perturbation comprises: applying a controlled perturbation to the training answer by replacing at least one entity represented within the training answer by a random entity of at least a same entity type.

B16. The method of any one of embodiments B13-B15, wherein assigning the first label or the second label comprises: computing an answer alignment score based on how closely the training predicted answer aligns with the perturbated answer.

B17. The method of embodiment B16, wherein assigning the first label or the second label comprises: assigning the first label to the training predicted answer based on the answer alignment score being greater than a first threshold alignment score; or assigning the second label to the training predicted answer based on the answer alignment score being less than a second threshold alignment score.

B18. The method of any one of embodiments B13-B17, further comprising: extracting training sets of token activations respectively associated with the plurality of training query-context-answer triplets, wherein the training sets of token activations correspond to token activations of an output layer of the second large language model during generation of a corresponding answer; and training, using the training sets of token activations and corresponding labels, the classification model to predict that a given answer generated by the first large language model was generated based on a given context or the model memory.

B19. The method of any one of embodiments B2-B18, wherein a model type of the first large language model comprises a Retrieval-Augmented Generation model, the method further comprises: selecting the second large language model such that a model type of the second large language model comprises the Retrieval-Augmented Generation model.

B20. The method of any one of embodiments B1-B19, comprising: responsive to receiving a request to determine whether an answer generated by a first large language model responding to an input prompt comprising a query and a context was based on model memory of the first large language model or the context, inputting the input prompt and the answer to a second large language model, wherein access to token activations of the first large language model is unavailable; determining token activations associated with the second large language model generating the answer based on the query and the context; inputting the token activations to a trained classification model to obtain a label indicating that the answer was generated by the first large language model using the context or the model memory; and providing, to a client device, a response to the request comprising the answer and the label.

B21. The method of embodiment B1, comprising receiving a request to determine whether an answer generated by a first large language model in response to a prompt is based on model memory or context; determining, using a second large language model, token activations associated with the second large language model generating the answer based on the prompt; and determining, using a trained classification model, a label indicating that the answer was generated by the first large language model using the context or the model memory.

C1. A method for configuring a classification model to determine whether answers generated by a large language model are based on contexts included in corresponding input prompts provided to the large language model or model memory of the large language model.

C2. The method of embodiment C1, comprising: inputting a query and a context into a trained large language model to obtain a first answer; generating a perturbated first answer and a perturbated context by applying a perturbation to the first answer, wherein the perturbated context comprises the perturbated first answer; inputting the query and the perturbated context into the trained large language model to obtain a second answer; computing a score representing how closely the perturbated first answer and the second answer align with the perturbated context, wherein a label is assigned to a data structure comprising the query, the perturbated context, and the perturbated first answer based on the score; extracting, from an output layer of the trained large language model, a set of token activations associated with the trained large language model generating the second answer; storing, as a training sample to train a classification model, the set of token activations with the label; and training, using training data comprising the training sample, the classification model to determine whether the trained large language model generates a given answer based on a corresponding input context or model memory.

C3. The method of embodiment C2, wherein generating the perturbated first answer and perturbated context comprises: applying a random perturbation to the first answer to obtain the perturbated first answer, wherein the random perturbation comprises a random word of the first answer inside the context being replaced to create the perturbated context.

C4. The method of any one of embodiments C2-C3, wherein generating the perturbated first answer and perturbated context comprises: applying a controlled perturbation to the first answer to obtain the perturbated first answer, wherein the controlled perturbation comprises replacing an entity of the first answer with a random entity a same type.

C5. The method of any one of embodiments C2-C4, wherein computing the score comprises: determining that a similarity metric is greater than a first threshold indicative of the trained large language model using the perturbated context to generate the second answer; and assigning a first label to the data structure, wherein the training sample is stored with a plurality of training samples that were assigned the first label.

C6. The method of any one of embodiments C2-C5, wherein computing the score comprises: determining that a similarity metric is less than a second threshold indicative of the trained large language model using the model memory to generate the second answer; and assigning a second label to the data structure, wherein the training sample is stored with a plurality of training samples that were assigned the second label.

C7. The method of any one of embodiments C2-C6, wherein generating the perturbated context comprises: inserting at least one recitation of the perturbated first answer within the perturbated context.

C8. The method of embodiment C7, wherein inserting the at least one recitation of the perturbated first answer comprises: replacing a recitation of the first answer within the context with the perturbated first answer to form the perturbated context.

C9. The method of any one of embodiments C2-C8, further comprising: receiving, from a client device, (i) an input prompt comprising a sample query and sample context and (ii) a sample answer produced by the trained large language model in response to the input prompt; extracting token activations associated with the trained large language model generating the sample answer based on the input prompt; and inputting the token activations to the classification model to obtain an output flag indicating whether the trained large language model used the sample context or the model memory to generate the sample answer.

C10. The method of embodiment C9, wherein the output flag indicates that the sample answer was generated by the trained large language model using the sample context, the method comprises: providing, to the client device, the sample answer with the output flag to indicate that the sample answer is based on the sample context.

C11. The method of any one of embodiments C9-C10, wherein the output flag indicates that the sample answer was generated by the trained large language model using the model memory, the method comprises: providing, to the client device, the sample answer with the output flag to indicate that the sample answer is based on the model memory.

C12. The method of any one of embodiments C9-C11, wherein the token activations comprise first token activations, and wherein the output flag indicates that the sample answer was generated by the trained large language model using the model memory, the method comprises: generating an instruction to input the sample query and sample context to the trained large language model to obtain a new sample answer; extracting new token activations associated with the trained large language model generating the new sample answer based on the input prompt; and inputting the new token activations to the classification model to obtain an updated flag indicating that the trained large language model used the sample context instead of the model memory to generate the new sample answer.

C13. The method of any one of embodiments C2-C12, wherein computing the score comprises: computing an alignment score indicating how closely a given answer aligns with an expected answer.

C14. The method of embodiment C13, wherein computing the alignment score comprises: generating embeddings of the given answer and the expected answer; and computing a similarity between the given answer and the expected answer.

C15. The method of any one of embodiments C2-C14, wherein the trained large language model comprises a first large language model with which token activations are accessible, the method further comprising: receiving, from a client device, (i) an input prompt comprising a sample query and sample context and (ii) a sample answer produced by a second large language model in response to the input prompt, wherein token activations of the second large language model are unavailable; inputting the input prompt to the first large language model to obtain a third answer; extracting token activations associated with the first large language model generating the third answer based on the input prompt; and inputting the token activations to the classification model to obtain an output flag indicating whether the second large language model used the sample context or the model memory to generate the sample answer.

C16. The method of embodiment C15, wherein the output flag indicates that the sample answer was generated by the first large language model using the sample context, the method comprises: providing, to the client device, the sample answer with the output flag to indicate that the second large language model generated the sample answer based on the sample context.

C17. The method of any one of embodiments C15-C16, wherein the output flag indicates that the sample answer was generated by the first large language model using the model memory, the method comprises: providing, to the client device, the sample answer with the output flag to indicate that the second large language model generated the sample answer based on the model memory.

C18. The method of any one of embodiments C1-C17, comprising: generating a perturbated first answer and a perturbated context by applying a perturbation to a first answer generated in response to an input prompt comprising a query and a context, wherein the perturbated context comprises the perturbated first answer; inputting the query and the perturbated context into a trained large language model to obtain a second answer; computing a score representing how closely the perturbated first answer and the second answer align with the perturbated context; extracting, from the trained large language model, a set of token activations associated with the trained large language model generating the second answer; storing, as a training sample to train a classification model, the set of token activations with a label based on an alignment score computed using the perturbated first answer and the second answer; and training, using training data comprising the training sample, the classification model to determine whether a given answer is produced based on provided context or model memory.

C19. The method of embodiment C1, comprising: generating a perturbated first answer and a perturbated context based on a first answer to a prompt comprising a query and a context, wherein the perturbated context comprises the perturbated first answer; inputting the query and the perturbated context into a trained large language model to obtain a second answer; extracting a set of token activations associated with the trained large language model generating the second answer; and storing, as a training sample, the set of token activations with a label based on an alignment score computed using the perturbated first answer and the second answer.

D1. One or more non-transitory, computer-readable media storing instructions that, when executed by a data processing apparatus, cause the data processing apparatus to perform operations comprising those of any of embodiments A1-A20, B1-B21, or C1-C19.

D2. A system comprising: memory storing computer program instructions; and one or more processors programmed with the computer program instructions to perform operations comprising those of any of embodiments A1-A20, B1-B21, or C1-C19.

D3. A system comprising means for performing any of embodiments A1-A20, B1-B21, or C1-C19.

D4. A system, comprising cloud-based memory, cloud-based control circuitry, and cloud-based I/O circuitry, wherein the cloud-based control circuitry is configured to perform the method of any of embodiments A1-A20, B1-B21, or C1-C19.

D5. The system of embodiment D4, wherein the cloud-based memory stores (i) a large language model trained to generate responses to input prompts and (ii) a classification model trained to input extracted token activations of an output layer of the large language model corresponding to answer portions of the responses and determine, based on the token activations, whether the large language model generated the answer portions using context portions respectively corresponding to the input prompts or model memory of the large language model; the cloud-based control circuitry is configured to: receive, from a client device, an input prompt comprising a query and a context; generate, using the large language model, an answer to the query; extract, from the output layer, a set of token activations associated with the large language model generating the answer; input the set of token activations to the classification model to obtain a label indicating that the answer was generated using the context or the model memory; and generate and assign a flag to the answer based on the label; and the cloud-based I/O circuitry is configured to display, using a graphical user interface rendered on the client device, a response to the input prompt comprising the answer and the flag.

D6. The system of embodiment D4, wherein the cloud-based memory stores (i) a first large language model trained to output token activations of a first output layer of the first large language model during generation of answers to input prompts, wherein the answers are generated using a second large language model, and wherein token activations of a second output layer of the second large language model during generation of the answers to the input prompts are not available, and (ii) a classification model trained to determine, based on the token activations, whether the second large language model generated the answers using contexts respectively corresponding to the input prompts or using model memory of the second large language model; the cloud-based control circuitry is configured to: receive, from a client device, a request to determine whether an answer, generated by the second large language model in response to an input prompt comprising a query and a context, is based on the context included in the input prompt or the model memory of the second large language model, wherein access to token activations of the second large language model is unavailable; input, to the first large language model, (a) the input prompt comprising the query and the context and (b) the answer generated by the second large language model in response to the input prompt to extract, from the first output layer of the first large language model, a set of token activations associated with the first large language model generating the answer; input the set of token activations to the classification model to obtain a label indicating that, based on the set of token activations, the second large language model generated the answer using the context of the input prompt or the model memory of the second large language model; and generate and assign a flag to the answer based on the label; and wherein the cloud-based I/O circuitry is configured to display, using a graphical user interface rendered on the client device, a response comprising the answer with the label.

D7. The system of embodiment D4, wherein the cloud-based memory stores a plurality of sample large language model prompts each comprising a query and a context; the cloud-based control circuitry configured to: generate training data to train a classification model to determine a source of an answer generated by a trained large language model, wherein the training data comprises a plurality of sample sets of token activations and a plurality of reference labels, wherein each sample set of token activations is associated with a corresponding answer generated by the trained large language model responding to a corresponding sample large language model prompt that is input to the trained large language model, and wherein the plurality of reference labels respectively indicate that the trained large language model generated the corresponding answer based on (a) a corresponding sample large language model context of the corresponding sample large language model prompt or (b) model memory of the trained large language model, wherein generating the training data comprises, for each of the plurality of sample large language model prompts: inputting the query and the context of the corresponding sample large language model prompt into the trained large language model to obtain a first answer; generating a perturbated first answer and a perturbated context by applying a perturbation to the first answer such that the perturbated context comprises the perturbated first answer in lieu of the first answer; inputting the query and the perturbated context into the trained large language model to obtain a second answer; computing a similarity score representing a similarity of the perturbated first answer and the second answer; determining a label to assign to the second answer, wherein the label comprises (i) a first value based on the similarity score being greater than a first threshold indicative of the trained large language model using the perturbated context to generate the second answer or (ii) a second value based on the similarity score being less than a second threshold indicative of the trained large language model using model memory to generate the second answer; and extracting, from an output layer of the trained large language model, a sample set of token activations associated with the trained large language model generating the second answer based on the query and the perturbated context, wherein a training sample of the training data comprises the sample set of token activations and the label; and train, using the training data, the large language model classification model; and wherein the cloud-based I/O circuitry is configured to display, using a graphical user interface, in response to an input prompt comprising a sample query and sample context provided to the trained large language model, a response to the input prompt comprising a sample answer generated by the trained large language model and a flag indicating that the sample answer was generated by the trained large language model using the sample context or the model memory.

What is claimed is:

1. A system for detecting large language model outputs the system comprising:

cloud-based memory storing (i) a large language model trained by using the large language model outputs to generate responses to input prompts and (ii) a classification model trained to input extracted token activations of an output layer of the trained large language model corresponding to answer portions of the responses and to determine, based on the extracted token activations, whether the large language model generated the answer portions using context portions respectively corresponding to the input prompts or model memory of the large language model, wherein the large language model outputs were generated using the model memory instead of input context;

cloud-based control circuitry configured to:

receive, from a client device, an input prompt comprising a query and a context;

in response to the receiving of the input prompt:

generate, using the trained large language model executed on a computing device, an answer to the query;

extract, based on a vector of logit values from the output layer of the trained large language model, a set of token activations associated with the large language model generating the answer;

input the set of token activations to the trained classification model to obtain a label indicating that the answer was generated using the input context or the model memory of the large language model; and generate and assign a flag to the answer based on the label; and cloud-based I/O circuitry configured to display, via a graphical user interface rendered on the client device, a response to the input prompt comprising the answer and the flag.

2. A method for detecting large language model outputs, comprising:

receiving, from a client device, an input prompt comprising a query and a context;

in response to the receiving of the input prompt:

inputting, by a computing device, the input prompt comprising the query and the context into a trained large language model executed on the computing device to generate first answer to the query, wherein the large language model, which is trained by using the large language model outputs to generate responses to input prompts, is stored in a cloud-based memory, wherein the large language model outputs were generated by using a model memory instead of input context;

extracting, based on a vector of logit values from an output layer of the trained large language model, token activations associated with the first answer during generation of the first answer by the trained large language model;

inputting, using cloud-based control circuitry, the token activations to a trained classification model to obtain a label indicating that the first answer was generated by using the input context or the model memory associated with the trained large language model, wherein the classification model is trained to input the extracted token activations of the output layer of the trained large language model corresponding to answer portions of the responses and to determine, based on the extracted token activations, whether the trained large language model generated the answer portions using context portions respectively corresponding to the input prompts or the model memory of trained the large language model; and providing, via a graphical user interface rendered on the client device, as a response to the input prompt, the first answer with the label.

3. The method of claim 2, wherein receiving the input prompt comprises:

receiving the context comprising at least one recitation of an expected answer to the query.

4. The method of claim 2, wherein generating the first answer comprises:

tokenizing the input prompt into a plurality of tokens; and determining, based on the plurality of tokens, one or more tokens forming the first answer.

5. The method of claim 2, wherein extracting the token activations comprises:

extracting one or more token activations from a feed forward layer serving as the output layer of the trained large language model.

6. The method of claim 2, wherein extracting the token activations comprises:

performing a single forward pass through the trained large language model.

7. The method of claim 2, wherein the token activations comprise a first set of token activations and the label comprises a first label, the method further comprises:

generating, based on the trained large language model using the memory to generate the first answer instead of the context, a second answer to the query using the input prompt;

extracting, from the output layer, a second set of token activations associated with the second answer being generated; and inputting the second set of token activations into the trained classification model to obtain a second label indicating that the second answer was generated using the input context or the model memory.

8. The method of claim 7, further comprising:

providing, as an updated response to the input prompt, the second answer with the second label based on the second label indicating that the second answer was generated by the trained large language model using the context of the input prompt.

9. The method of claim 2, wherein extracting the token activations comprises:

extracting a vector of logit values from the output layer; and generating a set of token activations comprising a subset of logit values from the vector of logit values associated with the trained large language model generating the first answer.

10. The method of claim 2, wherein the trained large language model comprises a Retrieval-Augmented Generation model and the memory associated with the trained large language model comprises one or more account databases, the method further comprises:

determining, based on the label, that the first answer was generated by the Retrieval-Augmented Generation model using the one or more account databases;

generating, using the Retrieval-Augmented Generation model, based on the input prompt, a second answer to the query; and providing, as an updated response to the input prompt, the second answer with an updated label indicating that the second answer was generated by the Retrieval-Augmented Generation model using the context.

11. The method of claim 10, wherein generating the second answer comprises:

updating the input prompt to comprise an instruction to cause the Retrieval-Augmented Generation model to leverage the context of the input prompt to generate responses.

12. The method of claim 2, wherein generating the first answer comprises:

generating the first answer using a determined number of tokens, wherein the determined number of tokens is equal to a quantity of token activations included in the token activations.

13. The method of claim 2, further comprising:

generating training data for training the classification model to obtain the trained classification model, wherein the training data comprises labeled samples comprising a first label indicating that the trained large language model used input context to generate a corresponding answer or a second label indicating that the trained large language model failed to use the input context to generate the corresponding answer.

14. The method of claim 13, further comprising:

generating the labeled samples using a plurality of training query-context-answer triplets, each training query-context-answer triplet comprising a training query, a training context, and a training answer;

for each training query-context-answer triplet of the plurality of training query-context-answer triplets:

applying a perturbation to the training answer to generate a perturbated answer and a perturbated context including at least one recitation of the perturbated answer;

inputting a perturbated training prompt comprising the training query and the perturbated context into the trained large language model to obtain a training predicted answer; and assigning the first label to the training predicted answer based on the training predicted answer comprising the perturbated answer or the second label to the training predicted answer based on the training predicted answer comprising an answer different from the perturbated answer.

15. The method of claim 14, wherein applying the perturbation comprises:

applying a random perturbation to the training answer by replacing a random word of the training answer to obtain the perturbated answer, wherein the perturbated context includes at least one recitation of the training answer comprising the random word replaced.

16. The method of claim 14, wherein apply the perturbation comprises:

applying a controlled perturbation to the training answer by replacing at least one entity represented within the training answer by a random entity of at least a same entity type.

17. The method of claim 14, wherein assigning the first label or the second label comprises:

computing an answer alignment score based on how closely the training predicted answer aligns with the perturbated answer.

18. The method of claim 17, wherein assigning the first label or the second label comprises:

assigning the first label to the training predicted answer based on the answer alignment score being greater than a first threshold alignment score; or assigning the second label to the training predicted answer based on the answer alignment score being less than a second threshold alignment score.

19. The method of claim 13, further comprising:

extracting training sets of token activations respectively associated with the labeled samples, wherein the training sets of token activations correspond to token activations of the output layer of the trained large language model during generation of the corresponding answer;

training, using the training sets of token activations and the labeled samples, the trained classification model to predict that a given answer was generated by the trained large language model using the model memory or a given context.

20. One or more non-transitory computer readable media storing computer program instructions that, when executed by one or more processors of a computing system, configure the computing system to perform effectuate operations comprising:

receiving, from a client device, an input prompt comprising a query and a context;

in response to the receiving of the input prompt:

inputting the input prompt comprising the query and the context into a trained large language model to obtain a first answer to the query, wherein the large language model, which is trained by using a large language model outputs to generate responses to input prompts, is stored in a cloud-based memory, wherein the large language model outputs were generated using model memory instead of input context;

extracting, based on a vector of logit values from an output layer of the trained large language model, token activations associated with the first answer during generation of the first answer by the trained large language model;

inputting, using cloud-based control circuitry, the token activations to a trained classification model to obtain a label indicating that the first answer was generated using the input context or the model memory associated with the trained large language model, wherein the classification model is trained to input the extracted token activations of the output layer of the trained large language model corresponding to answer portions of the responses and to determine, based on the extracted token activations, whether the trained large language model generated the answer portions using context portions respectively corresponding to the input prompts or the model memory of the trained large language model; and providing, via a graphical user interface rendered on the client device, as a response to the input prompt, the first answer with the label.

* * * * *